(12) United States Patent
Launiere et al.

(10) Patent No.: US 11,415,502 B2
(45) Date of Patent: Aug. 16, 2022

(54) FLOW CELL SAMPLE GENERATOR

(71) Applicant: UCHICAGO ARGONNE, LLC, Chicago, IL (US)

(72) Inventors: Cari A. Launiere, Bolingbrook, IL (US); Peter A. Kozak, Willowbrook, IL (US); Janine Lichtenberger, Burr Ridge, IL (US); Candido Pereira, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 64 days.

(21) Appl. No.: 16/709,520

(22) Filed: Dec. 10, 2019

(65) Prior Publication Data

US 2021/0172853 A1 Jun. 10, 2021

(51) Int. Cl.
*G01N 1/10* (2006.01)
*G01N 15/14* (2006.01)

(52) U.S. Cl.
CPC .......... *G01N 15/1404* (2013.01); *G01N 1/10* (2013.01); *G01N 2001/1006* (2013.01)

(58) Field of Classification Search
CPC ................. G01N 15/1404; G01N 1/10; G01N 2001/1006; G01N 15/1406; G01N 2001/1445; G01N 2001/1463; G01N 2001/1472
USPC .............. 73/864.81, 864.21, 864.23–864.25, 73/864.34, 863.72, 863.73
See application file for complete search history.

(56) References Cited

U.S. PATENT DOCUMENTS

| | | | | |
|---|---|---|---|---|
| 3,475,950 | A * | 11/1969 | Ferrin ..................... | G01N 30/20 73/864.83 |
| 5,034,194 | A | 7/1991 | Miller et al. | |
| 5,404,761 | A * | 4/1995 | Fellay .................. | G01N 1/2035 73/863.23 |
| 5,413,005 | A * | 5/1995 | Gray .................... | G01N 1/2035 73/863.43 |
| 10,416,045 | B2 | 9/2019 | Launiere et al. | |
| 10,438,705 | B2 | 10/2019 | Cheatham et al. | |
| 2007/0219379 | A1* | 9/2007 | Itoh ....................... | C07D 233/56 548/343.1 |
| 2013/0233093 | A1* | 9/2013 | Pohl ...................... | G01N 1/405 73/863.21 |
| 2016/0329198 | A1* | 11/2016 | Badu-Tawiah ...... | H01J 49/0404 |

(Continued)

FOREIGN PATENT DOCUMENTS

| | | | |
|---|---|---|---|
| JP | 3707031 | * | 10/2005 |
| WO | 93/02346 | * | 2/1993 |
| WO | 2015/164620 | * | 10/2015 |

OTHER PUBLICATIONS

Abate, et al., "Glass coating for PDMS microfluidic channels by sol-gel methods," Lab on a Chip 8(4), pp. 516-518 (2008).

(Continued)

*Primary Examiner* — Robert R Raevis
(74) *Attorney, Agent, or Firm* — Foley & Lardner LLP

(57) ABSTRACT

A sample generator system includes a fluid source and a flow cell. The sample generator system includes a sampling system in communication with the flow cell to eject a fluid sample through an orifice in the flow cell. The sample generator system includes a gas pressure at the orifice in the flow cell greater than or equal to a fluid pressure at the orifice in the flow cell.

20 Claims, 15 Drawing Sheets

(56) References Cited

U.S. PATENT DOCUMENTS

2017/0045423 A1 2/2017 Launiere et al.

OTHER PUBLICATIONS

Jeromen, et al., "Laser Droplet Generation from a Metal Foil," Physics Procedia 56, pp. 720-729 (2014).

Luo, et al., "Fabrication of Solder Balls via Electromagnetic Jetting," 2018 IEEE 13th Annual International Conference on Nano/Micro Engineered and Molecular Systems (NEMS), pp. 519-522 (2018).

Luo, et al., "Printing solder droplets for micro devices packages using pneumatic drop-on-demand (DOD) technique," Journal of Materials Processing Technology 212(10), pp. 2066-2073 (2012).

Anheier, et al., "Technical Readiness and Gaps Analysis of Commercial Optical Materials and Measurement Systems for Advanced Small Modular Reactors," Pacific Northwest National Laboratory Report No. PNNL-22622, 302 pages (2013).

Bouse, "Some Screw Conveyor Parameters That Affect Capacity and Seed Damage," Oklahoma State University Thesis, 142 pages (1963).

Cabalin, et al., "Flow-injection analysis and liquid chromatography: surface-enhanced Raman spectrometry detection by using a windowless flow cell," Analytica Chimica Acta 318(2), pp. 203-210 (1996).

Coble, et al., "Review of Candidate Techniques for Material Accountancy Measurements in Electrochemical Separations Facilities," Nuclear Technology 206(12), pp. 1803-1826 (2019).

Guet & Ooms, "Fluid Mechanical Aspects of the Gas-Lift Technique," Annual Review of Fluid Mechanics 38, pp. 225-249 (2006).

Hahn & Omenetto, "Laser-Induced Breakdown Spectroscopy (LIBS), Part II: Review of Instrumental and Methodological Approaches to Material Analysis and Applications to Different Fields," Applied Spectroscopy 66(4), pp. 347-419 (2012).

Hudson, et al., "Applications of Laser-Induced Breakdown Spectroscopy (LIBS) in Molten Metal Processing," Metallurgical and Materials Transactions B 48, pp. 2731-2742 (2017).

Morrison & Bateman, "Transfer and Storage of Molten Salt for the Pyroprocessing of Used Nuclear Fuel," Journal of Nuclear Engineering and Radiation Science 3(1):011001, 8 pages (2017).

Mullen, et al., "Transfer characteristics of a lithium chloride-potassium chloride molten salt," Nuclear Engineering and Technology 49(8), pp. 1727-1732 (2017).

Quist, "A Windowless Cell for Laser—Raman Spectroscopy of Molten Fluorides," Applied Spectroscopy 25, pp. 80-82 (1971).

Tauber, et al., "Flowing liquid sample jet for resonance Raman and ultrafast optical spectroscopy," Review of Scientific Instruments 74(11), pp. 4958-4960 (2003).

Toth, et al., "Diamond-windowed cell for spectrophotometry of molten fluoride salts," Analytical Chemistry 41(4), pp. 683-685 (1969).

Xu & Yu, "Prediction of the pumping capacity for reverse-flow diverter pumps," Chemical Engineering Research and Design 92(7), pp. 1219-1226 (2014).

Yang, et al., "In situ SEM and ToF-SIMS analysis of IgG conjugated gold nanoparticles at aqueous surfaces," Surface and Interface Analysis 46(4), pp. 224-228 (2014).

Yang, et al., "Three-dimensional CFD simulations to study the effect of impeller geometry on internal flow field in ADS upward spiral flow target," Journal of Nuclear Science and Technology 55(12), pp. 1381-1392 (2018).

Young, "Windowless Spectrophotometric Cell for Use with Corrosive Liquids," Analytical Chemistry 36(2), pp. 390-392 (1964).

* cited by examiner

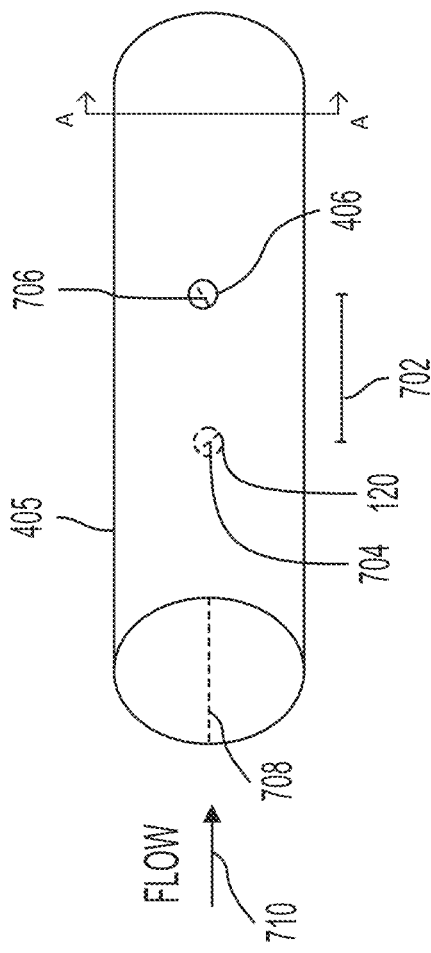
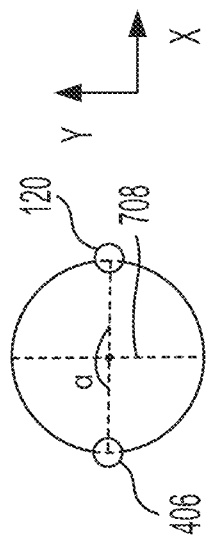
FIG. 7A
FIG. 7B
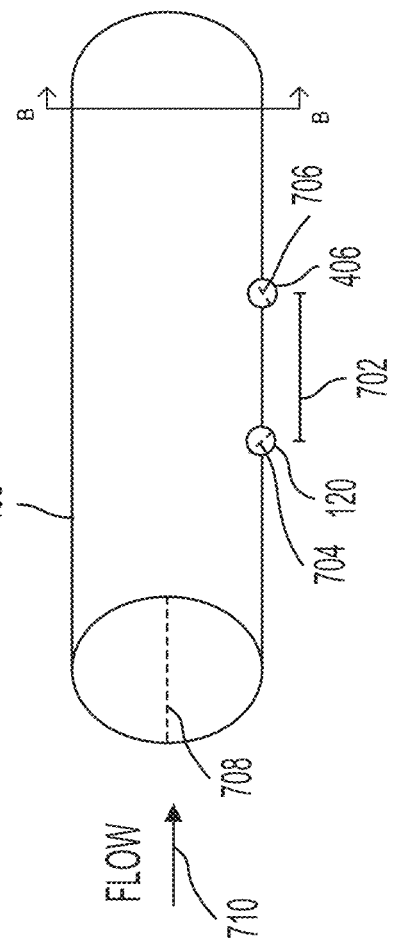
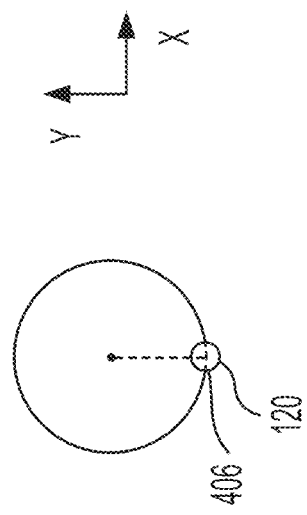
FIG. 7C
FIG. 7D

FLOW CELL SAMPLE GENERATOR

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present application relates generally to the fields of sample generation and of monitoring chemical processes, and more specifically to systems and methods for sampling and analyzing process fluids.

BACKGROUND

The analysis of process fluid constituents (components, contaminants, entrained gases and solids, etc.) can provide information on the properties or features of the fluid that can be useful for process monitoring, process control, process development, and basic science applications. Analysis of large numbers of samples can provide higher sensitivity, lower measurement uncertainty, and higher quantitative resolution than analysis of a lower number of samples due to the averaging out of random sampling and analysis errors. The generation and analysis of small-scale samples has been used in a variety of applications to facilitate high-throughput measurements, while keeping material usage and process impact to a minimum. However, few methods are available for the automated sample generation of high-temperature or highly corrosive fluids such as molten salts and molten metals, which has previously limited the implementation of high-throughput analysis of these materials.

SUMMARY

The present solution can combine the wide sample size range capabilities of pneumatically actuated sample generation through an orifice with leak-proof orifices in a flow cell by controlling the relative pressures of the fluid and gas at the orifice phase boundary. The flow cell can eject differently sized fluid samples on-demand through an orifice in the flow cell wall. "Fluid" can refer to a liquid with or without entrained solids or gases. The present solution can produce single droplets, a series of droplets (which can coalesce into single droplets), a stream, or a stream followed by droplets. The system can produce a sample that is composed of multiple samples added together to improve precision in sample sizing as a result of the averaging out of random errors inherent in any sample generation process. The system can have reproducible sample generation and produce differently sized samples with a single system configuration. The sample sizes can range from single 100 nL droplets through continuous sample ejection at 30 or more mL per minute. The flow cell design can be integrated into a continuously circulating sample loop and is suitable for corrosive, high-temperature, and high-radiation environments. The present solution can facilitate automated on-line, at-line, and off-line sampling-based analysis of molten salt or molten metal process fluids for industrial applications such as electrorefining or aluminum alloy production. The systems and methods of the present solution can provide a way of generating samples with a variety of sizes on-demand from a process (e.g., from a tank, vessel, process line, conduit, etc.). The present solution can create samples that are suitable for integration with automated on-line, at-line, and off-line process monitoring. The present solution can have applications in molten salt process development activities, such as generating large combinatorial libraries of molten salt samples for thermophysical property measurement.

At least one aspect of the present disclosure is directed to a sample generator system which can include a fluid source. The sample generator system can include a flow cell. The sample generator system can include a sampling system in communication with the flow cell to eject a fluid sample through an orifice in the flow cell. The sample generator system can include a gas pressure at the orifice in the flow cell greater than or equal to a fluid pressure at the orifice in the flow cell.

In some embodiments, the flow cell is a gravity flow cell. The sample generator system can include an upper reservoir configured to controllably contain a fluid. The upper reservoir can be vented to at least one of an ambient gas pressure or a cover gas pressure. The sample generator system can include a pump-driven conduit. The fluid source and the upper reservoir can form a recirculating flow path from the fluid source through the pump-driven conduit to the upper reservoir, and from the upper reservoir through the gravity flow cell to the fluid source.

In some embodiments the sample generator system includes a sample generator flow cell. The sample generator flow cell can have a first orifice from which fluid samples are ejected. The sample generator flow cell can have a second orifice where gas is injected to cause fluid ejection at the first orifice. The fluid pressure at the orifices can be less than or equal to the gas pressure outside the orifices. The sample generator flow cell can have vacuum driven flow, pressure driven flow, or gravity driven flow. For vacuum or pressure driven flow the cover gas pressure at the orifice can be controlled to be equal to or greater than the fluid pressure at the orifice.

The sample generator system can include an upper reservoir configured to controllably contain a fluid. The upper reservoir can be open to ambient pressure or a first cover gas pressure. The sample generator system can include a conduit with pump-driven flow. The sample generator system can include a gravity flow cell. The fluid source and the upper reservoir can form a recirculating flow path from the fluid source through the pump-driven conduit to the upper reservoir, and from the upper reservoir through the gravity flow cell to the fluid source. In some embodiments, the flow cell has an outlet exposed to ambient pressure or the first cover gas pressure. The sample generator system can include a sampling system in communication with the gravity flow cell to eject a fluid sample through an orifice in the gravity flow cell.

In some embodiments, the sample generator system includes a lower reservoir. In some embodiments the lower reservoir has a fluid surface that is exposed to the same ambient pressure or first cover gas pressure as the upper reservoir and flow cell outlet. The fluid source and the upper reservoir can form a recirculating flow path from the fluid source through the pump-driven conduit to the upper reservoir, and from the upper reservoir through the gravity flow cell to the lower reservoir.

In some embodiments, the sample generator system includes a fluid source that is part of a larger process. The fluid source and the upper reservoir can form a recirculating flow path from the fluid source through the pump-driven conduit to the upper reservoir, and from the upper reservoir through the gravity flow cell to the fluid source.

In some embodiments, the sample generator system includes a fluid source that is part of a larger process and a lower reservoir. In some embodiments the lower reservoir has a fluid surface that is exposed to the same ambient pressure or first cover gas pressure as the upper reservoir and flow cell outlet. The fluid source and the upper reservoir can form a non-recirculating flow path from the fluid source through the pump-driven conduit to the upper reservoir, and from the upper reservoir through the gravity flow cell to the lower reservoir.

In some embodiments, the orifice in the flow cell is a fluid sample ejection orifice. The sample generator system can include a gas injection orifice disposed on the flow cell. The sample generator system can include a gas injection orifice disposed on the flow cell downstream of the fluid sample ejection orifice. The sample generator system can include a characteristic diameter of the flow cell. The sample generator system can include a gas injection orifice disposed on the flow cell a distance from the fluid sample ejection orifice. The distance can be greater than or less than a multiple of the characteristic diameter of the flow cell.

In some embodiments, the orifice in the flow cell is a fluid sample ejection orifice oriented in a first direction. The sample generator system can include a gas injection orifice disposed on the flow cell and oriented in the first direction. The sample generator system can include a gas injection orifice disposed on the flow cell and oriented in a second direction.

In some embodiments, the sample generator system produces a sample at a first temperature having a volume of at least 100 nL. In some embodiments, the sample generator system includes a substrate, an analysis substrate, a sample well, or a sample vessel. The sample generator system can include the fluid sample disposed on the substrate, analysis substrate, sample well, or sample vessel. The deposited sample can be cooled or heated to a second temperature. The deposited sample can include a substance. The substance can include a fluid or frozen sample. To measure a property of the substance, the sample generator system can include at least one of an alpha particle spectrometer, a gamma ray spectrometer, a neutron spectrometer, a laser induced breakdown spectrometer, an ultraviolet-visible spectrometer, a Raman spectrometer, an X-ray fluorescence spectrometer, a Fourier transform infrared spectrometer, an X-ray diffraction spectrometer, an X-ray photoelectron spectrometer, an electrochemical sensor, a piezoelectric sensor, a mass spectrometer, a density sensor, a viscosity sensor, an acoustic sensor, an imager and image analysis system, a calorimeter, or a temperature sensor.

In some embodiments, the orifice in the flow cell is a fluid sample ejection orifice. The sample generator system can include a gas injection orifice disposed on the flow cell. The fluid sample can be a stream ejected from the fluid sample ejection orifice at a rate of at least 50 μL per second. In some embodiments, the sample generator system includes a process vessel or conduit. The fluid source can be contained in the process vessel or conduit. In some embodiments, the fluid is at least one of a molten salt or molten metal.

At least one aspect of the present disclosure is directed to a method for analyzing a process fluid. The method can include extracting a fluid from a process. The method can include applying pneumatic actuation to a gas injection orifice. The method can include generating, through a fluid sample ejection orifice, a fluid sample from the fluid extracted from the process. The method can include active or passive sample cooling to a second temperature at which the sample is a solid. The method can include returning the sample extracted from the process back to the process. In some embodiments, the sample extracted from the process is returned to the process.

In some embodiments, the fluid or solid sample is a droplet. The method can involve a rounded droplet or a flat droplet depending on the wetting properties of the substrate. The method can include transporting the droplet to a detector and analyzing, by the detector, a property of the droplet. The detector can include at least one of an alpha particle spectrometer, a gamma ray spectrometer, a neutron spectrometer, a laser induced breakdown spectrometer, an ultraviolet-visible spectrometer, a Raman spectrometer, an X-ray fluorescence spectrometer, a Fourier transform infrared spectrometer, an X-ray diffraction spectrometer, an X-ray photoelectron spectrometer, an electrochemical sensor, a piezoelectric sensor, a mass spectrometer, a density sensor, a viscosity sensor, a calorimeter, or a temperature sensor. The sample can be a droplet having a volume of at least 100 nL.

In some embodiments, the fluid sample, originally at a first temperature, is cooled to a second temperature before analysis. In some embodiments the fluid or solid sample is dissolved in a second fluid before analysis.

In some embodiments, the sample is analyzed in-flight before depositing on a substrate or collection vessel by a technique such as laser induced breakdown spectroscopy.

In some embodiments of the system, the fluid is not removed from the conduit through the orifice. In some embodiments the first orifice acts as a windowless optical cell. In some embodiments, the first and second orifices act as a windowless optical cell. In some embodiments, two opposing orifices create a windowless optical path. In some embodiments, analysis of the fluid occurs by coupling an optical or radiometric analytical instrument to the orifice. The instrument may be one or more of a gamma ray spectrometer, a neutron spectrometer, a laser induced breakdown spectrometer, an ultraviolet-visible spectrometer, a Raman spectrometer, an X-ray fluorescence spectrometer, a Fourier transform infrared spectrometer, a blackbody temperature sensor, a Doppler shift flow meter, or an optical scatter flow meter. In some embodiments, the windowless optical cell is used for identification, quantification, or characterization of one or more fluid properties or constituents (e.g., elements, radioisotopes, compounds, entrained solids, entrained gases, particle compositions, particle concentration, particle sizes, dynamic structures, temperature, density, viscosity, flow rate, fluid flow profile, or particle flow profile). In some embodiments, the windowless optical cell is used for monitoring processes in the fluid such as nucleation or particle growth.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 7A illustrates a schematic diagram of a tube of a gravity flow cell, according to an embodiment. FIG. 7B illustrates a schematic cross-sectional view of a tube of the gravity flow cell shown in FIG. 7A, taken along plane A-A. FIG. 7C illustrates a schematic diagram of a conduit of a gravity flow cell, according to an embodiment. FIG. 7D illustrates a schematic cross-sectional view of a conduit of the gravity flow cell shown in FIG. 7C, taken along plane B-B.

Like reference numbers and designations in the various drawings indicate like elements.

DETAILED DESCRIPTION

Figure 1:
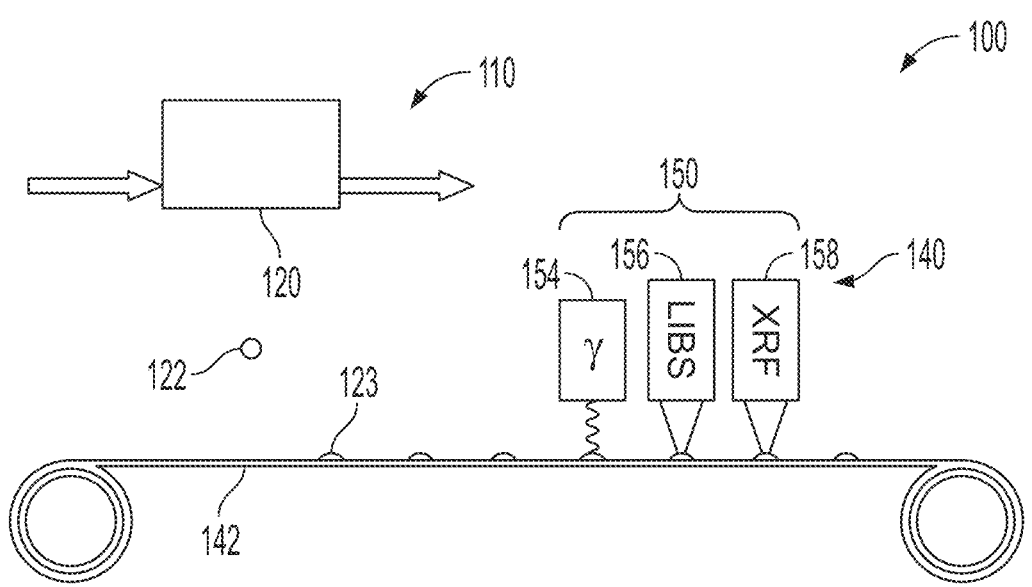
FIG. 1 illustrates a schematic diagram of an example automated sampling and analysis system, according to an embodiment.

Following below are more detailed descriptions of various concepts related to, and implementations of systems, methods, and apparatuses for flow cell sample generation. The various concepts introduced above and discussed in greater detail below can be implemented in any of numerous ways, including in automated on-line, at-line, and off-line sampling-based analysis of molten salts or molten metals.

There are few automated tools for monitoring the chemical or particle content of molten process salts or molten metals. Most composition analysis requires sampling and manual analysis in a lab. This is problematic due to long turn-around times, low-throughput, high labor costs, and danger to workers. Furthermore, manual handling of samples complicates safeguards and material accountancy procedures. There are some dip-probe and stand-off technologies under development for in-situ optical analysis of molten salt or molten metal. However, an automated sampling and analysis approach can have many benefits relative to stand-off or dip probe methods. Firstly, stand-off and dip probe methods are usually fixed in place, and therefore can only analyze a small portion of the process fluid. Sampling loops, on the other hand, can be used to access a larger portion of the process fluid so that the analysis is more representative of the bulk fluid. Secondly, sampling loops are capable of transporting fluids away from very high temperature or high-radiation areas to protect the instrumentation and allow analysis by a wider range of analytical techniques than is possible in-situ. Thirdly, each stand-off or dip probe method will have its own footprint, cabling, and maintenance requirements, which will limit the total number of on-line analysis techniques that can be used and will add complexity and cost to the process. A sampling loop approach allows multiple analysis techniques to be interfaced with a single sampling unit so that multiple analysis techniques can be implemented with a single small footprint at the process. This approach can simplify maintenance activities by locating instrumentation in more accessible areas of the facility.

The present disclosure is directed to systems and methods for sample generation and for sampling and analyzing process fluids. The present solution can combine a gravity flow cell with the direct pneumatic actuation of sample ejection through an orifice. By leveraging pressure matching at an orifice in the flow cell, the flow cell can facilitate leak-free fluid flow through a conduit that has holes (e.g., orifices, etc.) in its wall. The orifices can be used for injecting gas into the conduit and ejecting samples from the conduit on-demand. By leveraging Bernoulli's Principle, the gravity flow cell can facilitate leak-free fluid flow in an ambient pressure system. The direct pneumatic actuation of sample generation from flowing fluid can facilitate a range of different sample sizes. The present solution can achieve precision across a wide sample size range, a range that is not achievable with any single mechanism in commercially available sampling systems. The present solution can be used in sampling-based process monitoring. The present solution can have applications as a laboratory tool for generating samples. The present solution can be used as a high temperature automated pipette. The present solution can be used for the high-throughput or low-throughput, high-temperature, on-demand generation of molten salt or molten metal samples. The present solution can produce nanoliter- to liter-scale samples of molten or frozen fluid (e.g., salt, metal, etc.) in a format that is convenient for integration with automated on-line, at-line, and off-line analysis.

The present solution can improve upon standard analytical techniques by using high-throughput sampling and analysis, which can reduce random statistical error associated with measurement and sampling inhomogeneity. Collection and measurement of a large number of samples, as is possible with the samples generated by the present solution, can reduce the statistical error associated with more traditional sample collection methods. For radioactive materials, the small samples that can be produced by the present solution can be analyzed by radiation detectors that would be overwhelmed by exposure to the bulk fluid. For high temperature materials, the small sample scale facilitates rapid sample cooling to enable contact with room temperature or cooled detectors. Therefore, the present solution's capability to generate small samples makes it compatible with a significantly wider range of detectors than can be used for in-situ measurements of high temperature or radioactive materials. Traditional manual molten salt sampling techniques have poor control over sample volume and are not suitable for industrial implementation in high-radiation environments. The present solution improves on existing technology because it facilitates the automated generation of molten salt samples with precise control of sample volume using robust, radiation resistant mechanisms. The present solution can provide a way of generating samples with a variety of sizes on-demand from a molten salt vessel. The present solution can create samples on-demand that are suitable for integration with automated on-line, at-line, and off-line process monitoring.

The present solution can be used to generate samples for automated sampling-based on-line, at-line, and off-line process monitoring for a variety of processes including low temperature or room temperature operations (such as aqueous or solvent based processes) as well as elevated temperature applications such as molten salt and molten metal processes with operating temperatures up to about 750° C. The present solution can generate microliter-scale samples with precision as well as bulk samples of unlimited size. The present solution can be more versatile than fluid handling techniques on commercially available automated fluid handling systems. The present solution can be used for ambient or elevated temperature applications, including laboratory automation, pharmaceutical and biotech research, water treatment and environmental monitoring, pharmaceutical manufacturing, extractive metallurgy, magnesium and aluminum alloy production and recycling, and chemical manufacturing and reprocessing.

The present solution can be used as a laboratory tool. The present solution can be used as an automated molten salt or molten metal pipette with a sample size range of 100 nL (or less) to a maximum that may be limited only by the volume of fluid in the lower reservoir or process. The present solution is suitable for generating large numbers of salt or metal samples. Large combinatorial libraries of samples with many replicates can be produced for material property measurement studies. This will be beneficial because greater numbers of distinct compositions can be analyzed than with existing methods, and because analysis of large numbers of replicate samples improves precision over the analysis of small numbers of samples.

The present solution can facilitate the analysis of large numbers of samples. The present solution can break a bulk fluid down into many hundreds or thousands of small samples while using small amounts of material. The present solution can generate samples from a small fraction of the fluid flowing through the loop while recirculating most of the fluid back to its source, which can aid mixing and facilitates the generation of samples that are representative of the bulk material. The present solution can increase the throughput of many research activities involving molten salt sample generation and analysis, which are currently done manually.

FIG. 1 illustrates a schematic diagram of an example automated sampling system 100. The automated sampling system 100 (e.g., sample generator system, sampling system, etc.) can include a sampling system 110 (e.g., micro-sampling system, molten sampling system, droplet sampling system, fluid sampling system, stream sampling system, etc.). For example, the sampling system 110 can include a micro-sampling system for generating droplet samples on the order of tens or hundreds of microliters. The automated sampling system 100 can include an analysis system 140 to analyze samples from the sampling system 110. The automated sampling system 100 can be in communication with a gravity flow cell to eject a fluid sample through an orifice 120 in the gravity flow cell.

The sampling system 110 can include a fluid sample 122. The fluid sample 122 can originate from a fluid source. Molten salts (e.g., LiCl—KCl eutectic, etc.), molten salt electrolyte solutions, molten metals (e.g., aluminum, etc.), organic or aqueous solvents, solutes, entrained gases or solids, radioactive materials, or combinations thereof can comprise the liquid source. The fluid sample 122 can include a fraction of the total fluid source. For example, the fluid sample 122 can be a droplet of the fluid source. The fluid source can include molten materials. The automated sampling system 100 can generate a droplet having a volume of at least 100 nL. The automated sampling system 100 can eject a stream from the fluid sample ejection orifice at a rate of at least 50 µL per second. The automated sampling system 100 can eject a stream of droplets from the fluid sample ejection orifice at a rate of 30 or more mL per minute.

The sampling system 110 can include a fluid sample ejection orifice 120 (e.g., sample outlet, etc.). The fluid sample ejection orifice 120 can be an orifice through which the fluid sample 122 passes through. For example, the fluid sample 122 can pass through the fluid sample ejection orifice 120 from the sampling system 110 to be further analyzed by the analysis system 140.

The automated sampling system 100 includes an analysis system 140. The analysis system 140 can include an analysis substrate 142. The fluid sample 122 can be disposed on the analysis substrate 142. The fluid sample 122 can deposit onto the analysis substrate 142. The analysis system 140 can include a detector 150 to measure a property of the fluid sample 122 or solid sample 123. The analysis substrate 142 can transport the fluid sample 122 to the detector 150. For example, the analysis substrate 142 can include a conveyor system or rotating platform to transport the fluid sample 122 or solid sample 123 to the detector 150. The analysis substrate 142 can hold multiple fluid samples 122 or solid samples 123 from the sampling system 110. The analysis system 140 can be coupled to the sampling system 110 such as to form the automated sampling system 100.

The analysis system 140 can include a detector 150 to measure a property of the fluid sample 122 or solid sample 123. The property of the fluid sample 122 or solid sample 123 can include a thermophysical or thermochemical property (e.g., viscosity, density, thermal conductivity, heat capacity, freezing behavior, solubility of reaction and corrosion products, index of refraction, etc.). The detector 150 can perform chemical and isotopic measurements by one or more individual systems such as, but not limited to performance of mass spectrometry, spectroscopic measurements, acoustic measurements, or radiometric analysis. For example, the detector 150 can include one or more of a gamma ray spectrometer 154, a laser induced breakdown spectrometer (LIBS) 156, or an X-ray fluorescence (XRF) spectrometer 158. In some embodiments, the detector 150 can include a neutron spectrometer, an ultraviolet-visible spectrometer, or a Raman spectrometer.

Figure 2:
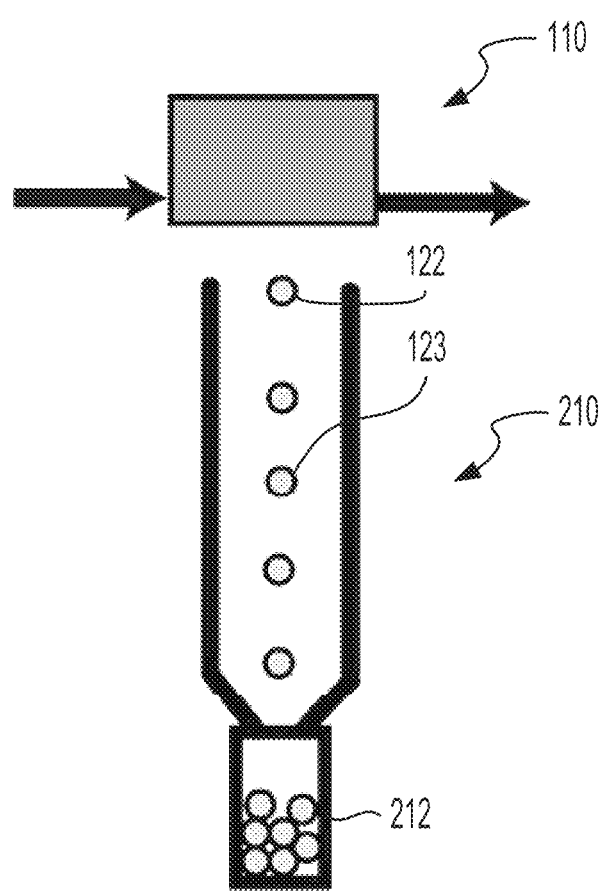
FIG. 2 illustrates a diagram of a sampling system and a solid sample collection apparatus, according to an embodiment.

FIG. 2 illustrates a diagram of a sampling system 110 and a sample collection apparatus 210, according to an embodiment. The sample collection apparatus 210 can collect solid samples 123 in a convenient pourable form to be analyzed off-line. The solid samples 123 can be funneled into a collection chamber 212.

Figure 3:
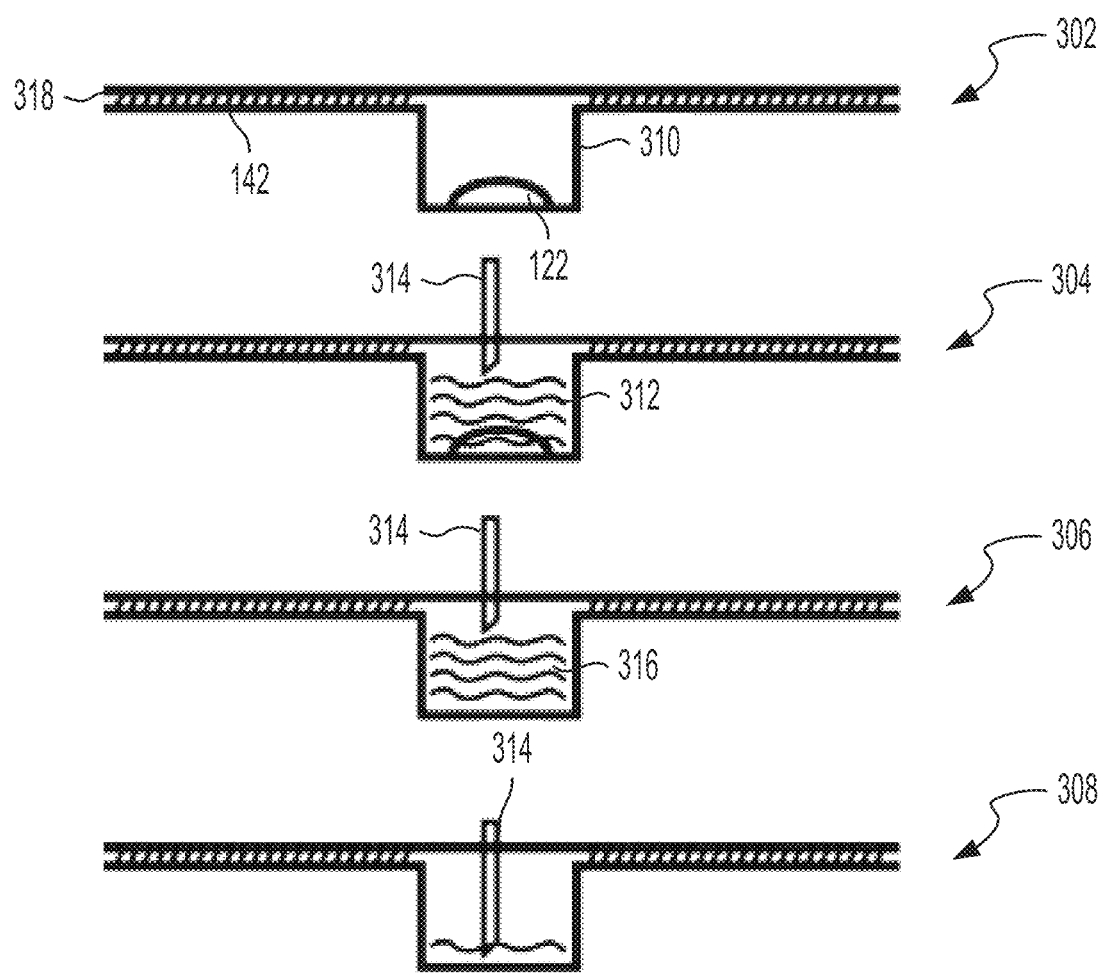
FIG. 3 illustrates a schematic flow diagram of an example analysis system, according to an embodiment.

FIG. 3 illustrates a schematic flow diagram of an example analysis system 140. The analysis system 140 can include the analysis substrate 142 (e.g., deposition substrate, etc.). The analysis substrate 142 can include one or more wells 310. A well 310 can be a part of the analysis substrate 142. The well 310 can be continuous with the analysis substrate 142. The well 310 can be removably attached to the analysis substrate 142. The well 310 can be sealed with a sealing substrate 318 to prevent contamination of the sample during transport to an off-line analysis system.

At STEP 302, the fluid sample 122 or solid sample 123 can be located inside the well 310. The sampling system 110 can deposit the fluid sample 122 or solid sample 123 into the well 310. The sampling system 110 can deposit multiple fluid sample 122 or solid sample 123 items into the well 310. The fluid sample 122 can be ejected from the fluid sample ejection orifice 120.

At STEP 304, a solvent 312 (e.g., water, buffer solution, etc.) can be injected into the well 310. The analysis system 140 can include a nozzle 314. The nozzle 314 can inject the solvent 312 into the well 310. The nozzle 314 can be connected to a solvent tank from which solvent 312 can be injected into the well 310. The nozzle 314 can have an adjustable height.

At STEP 306, the fluid sample 122 or solid sample 123 can be dissolved into the solvent 312 to produce a solution of fluid sample dissolved in solvent 316. The fluid sample 122 can be dissolved into the solvent 312 by applying heat. The fluid sample 122 can be dissolved into the solvent 312 by agitating the analysis substrate 142. The fluid sample 122 can be dissolved into the solvent 312 by agitating the well 310.

At STEP 308, the fluid sample dissolved in solvent 316 can be transported by the nozzle 314 or a second nozzle to a detector 150. The detector 150 can measure a property of the fluid sample dissolved in solvent 316. The property of the fluid sample dissolved in solvent 316 can include a physical property or chemical or isotopic measurements. The detector 150 can perform mass spectrometry, spectroscopic measurements, or radiometric analysis. For example, the detector 150 can include an inductively coupled plasma mass spectrometer, an ultraviolet-visible spectrometer, a Raman spectrometer, or one or more electrochemical sensors.

Figure 4:
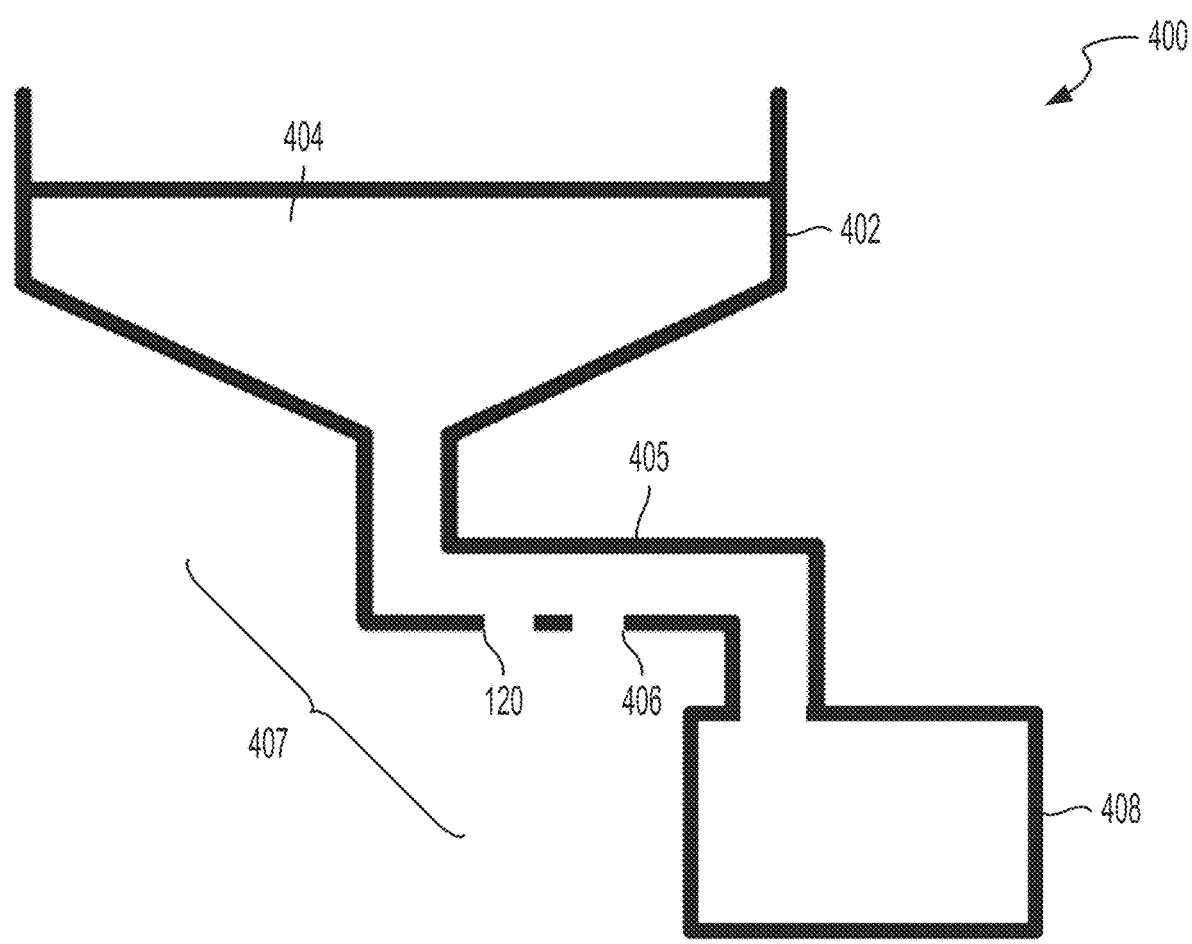
FIG. 4 illustrates a schematic diagram of a flow cell sample generator, according to an embodiment.

FIG. 4 illustrates a flow cell sample generator 400 (e.g., droplet generator flow cell, etc.). The flow cell sample generator 400 can include a gravity flow cell 407. The gravity flow cell 407 can provide a system for reliable sample generation from a leak-free orifice. The flow cell sample generator 400 can include a gravity flow cell pneumatic droplet generator.

The flow cell sample generator 400 can facilitate leak-free access to flowing fluid through orifices. Hydraulic head, cross sectional area, and flow velocity can be balanced to employ Bernoulli's Principle and the Venturi Effect to set the fluid pressure in the orifice region at less than ambient pressure. The negative pressure (relative to the gas outside the orifice) can prevent fluid from escaping from the orifice during steady-state operation. Samples can be generated by applying gas pressure to one orifice 406, which results in fluid being ejected from a second, nearby orifice 120. The supplied gas pressure, pressure pulse length, and orifice diameters are tunable parameters affecting sample size and sample type (i.e. droplet, multiple droplets, or stream). Other parameters that affect system operation are the orientation of the gas inlet and sample outlet orifices and their positions relative to each other, as well as the fluid head and flow velocity in the gravity flow cell 407.

The flow cell sample generator 400 can include an upper reservoir 402. The upper reservoir 402 is configured to controllably contain a fluid 404. In some embodiments the fluid is a molten salt. The upper reservoir 402 can be vented to ambient pressure or a first cover gas pressure. The fluid source and the upper reservoir 402 can form a recirculating flow path from the fluid source through a pump-driven conduit, described in detail herein below, to the upper reservoir 402, and from the upper reservoir 402 through the gravity flow cell 407 to the fluid source. The upper reservoir 402 can include baffles in the interior of the upper reservoir 402 to provide heat transfer. The upper reservoir 402 can be composed of stainless steel, nickel, or other material that is compatible with the fluid 404.

The flow cell sample generator 400 can include a conduit 405. The conduit 405 can couple the upper reservoir 402 to a lower reservoir 408. The conduit 405 can include orifices disposed on the conduit 405. For example, the conduit 405 can include a fluid sample ejection orifice 120. The conduit 405 can include a gas injection orifice 406.

The flow cell sample generator 400 can include a gas injection orifice 406 (e.g., gas inlet, etc.). The gas injection orifice 406 can be disposed on the conduit 405. The gas injection orifice 406 can be coupled to a gas supply. For example, the gas injection orifice can be connected to the gas supply through a conduit. The gas injection orifice 406 can be oriented in a first direction. The gas injection orifice 406 can be oriented radially outward from the conduit 405.

The flow cell sample generator 400 can include the fluid sample ejection orifice 120. The fluid sample ejection orifice 120 can be disposed on conduit 405. The fluid sample ejection orifice 120 can include a stainless-steel orifice. The fluid sample ejection orifice 120 can be located upstream of the gas injection orifice 406. The fluid sample ejection orifice 120 can be located downstream of the gas injection orifice 406. The fluid sample ejection orifice 120 can be oriented in the first direction. The fluid sample ejection orifice 120 can be oriented in a second direction. The fluid sample ejection orifice 120 can be oriented radially outward from the conduit 405. The conduit 405 can have an outlet vented to ambient pressure or the first cover gas pressure.

The flow cell sample generator 400 can include a lower reservoir 408. In some embodiments, the lower reservoir is a fluid source. The lower reservoir can be vented to ambient pressure or the first cover gas pressure. The lower reservoir 408 can include baffles in the interior of the lower reservoir 408 to provide heat transfer. The lower reservoir 408 can be composed of stainless steel, nickel, or other material that is compatible with fluid 404.

Figure 5:
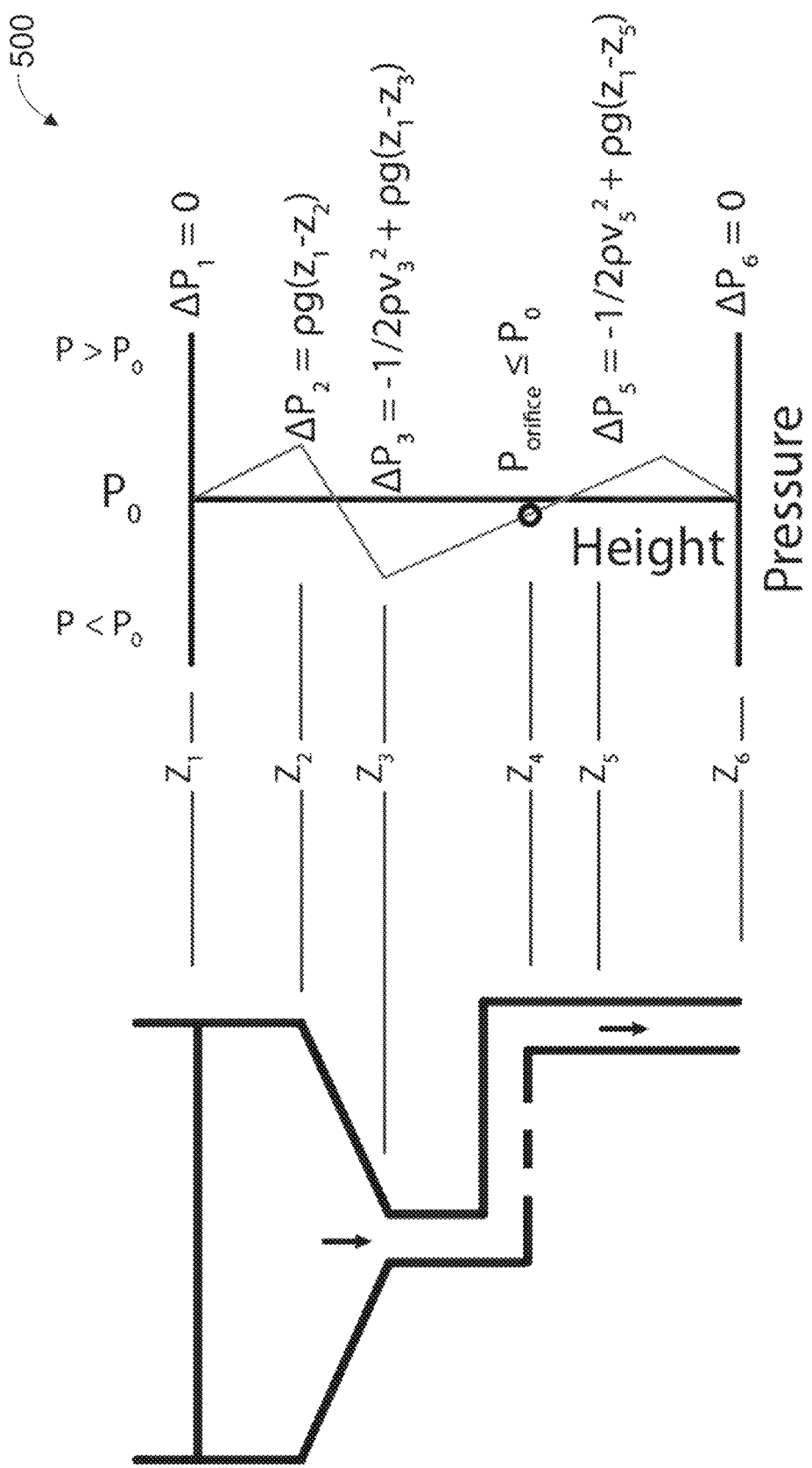
FIG. 5 illustrates a plot of a simplified pressure profile, according to an embodiment.

FIG. 5 illustrates a plot of a simplified pressure profile 500. The pressure profile 500 depicts the effects of fluid depth (e.g., hydraulic head, etc.) and velocity on fluid pressure. $P_0$ is the ambient pressure or the first cover gas pressure, and $P_1$ is the fluid pressure at the gas-fluid interface in the upper reservoir (position $Z_1$). The difference in pressure ($\Delta P_1$) between the pressure $P_1$ and pressure $P_0$ is 0. The approximate difference in pressure ($\Delta P_2$) between the pressure $P_2$ (fluid pressure at $Z_2$) and pressure $P_0$ is given by Equation 1:

$$\Delta P_2 = \rho g(z_1 - z_2) \qquad (1)$$

where P is the fluid pressure, $\rho$ is the density of the fluid, g is the gravitational constant, $z_1$ is the depth of the fluid at $Z_1$, and $z_2$ is the depth of the fluid at $Z_2$.

The approximate difference in pressure ($\Delta P_3$) between the pressure $P_3$ (fluid pressure at $Z_3$) and pressure $P_0$ is given by Equation 2:

$$\Delta P_3 = -\frac{1}{2}\rho v_3^2 + \rho g(z_1 - z_3) \qquad (2)$$

where P is the fluid pressure, $\rho$ is the density of the fluid, v is the velocity at height $Z_3$, g is the gravitational constant, $z_1$ is the depth of the fluid at $Z_1$, and $z_3$ is the depth of the fluid at $Z_3$.

The fluid pressure at the sample ejection orifice 120 ($P_{orifice}$) is less than or equal to the ambient pressure or first cover gas pressure $P_0$.

The approximate difference in pressure ($\Delta P_5$) between the pressure $P_5$ (fluid pressure at $Z_5$) and pressure $P_0$ is given by the following equation:

$$\Delta P_5 = -\frac{1}{2}\rho v_5^2 + \rho g(z_1 - z_5) \qquad (3)$$

where P is the fluid pressure, v is the velocity at height $z_5$, $\rho$ is the density of the fluid, the gravitational constant, $z_1$ is the depth of the fluid at $Z_1$, and $z_3$ is the depth of the fluid at $Z_5$.

The difference in pressure ($\Delta P_6$) between the pressure $P_6$ (pressure at the gravity flow cell 407 exit) and pressure $P_0$ is 0.

Figure 6:
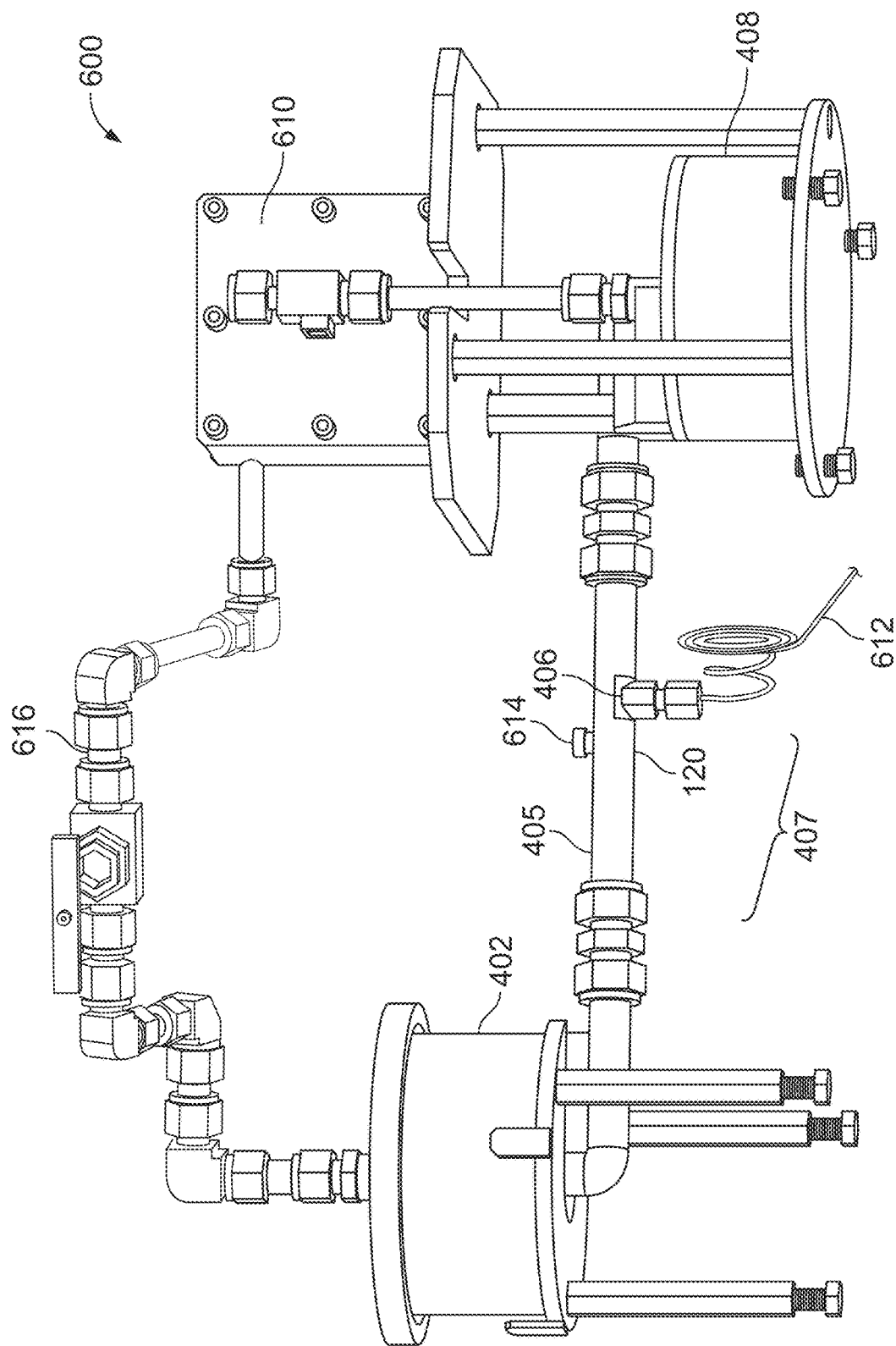
FIG. 6 illustrates a flow loop sample generator, according to an embodiment.

FIG. 6 illustrates a flow loop sample generator 600 (sampling loop droplet generator, droplet generator system, etc.). The flow loop sample generator 600 can circulate fluids from a lower reservoir 408 or process vessel, into an upper reservoir 402 (e.g., elevated reservoir, etc.), through a gravity flow cell droplet generator (e.g., gravity flow cell 407, etc.), and back to the lower reservoir 408 or process vessel.

The fluid source can be contained in the lower reservoir 408, as illustrated in FIG. 6, or may include a process vessel (e.g., molten salt vessel, etc.). In some embodiments, the lower reservoir 408 can drain into a process vessel. The gravity flow cell 407 has one or more orifices into which gas is injected (e.g., (gas injection orifice 406, etc.) and one or more orifices from which fluid samples are ejected (e.g., fluid sample ejection orifice 120, etc.). The pressure in the gravity flow cell is balanced based on Bernoulli's principle such that the fluid pressure at the fluid sample ejection orifice 120 is below ambient or cover gas pressure at the orifice during steady state operation. This pressure balance can prevent fluids from leaking out of the fluid sample ejection orifices in-between on-demand sample generation events. Ejection of a sample (e.g. droplet, a stream of droplets, or a stream of fluid, a combination of a stream and droplets, etc.) from the fluid sample ejection orifice 120 can be actuated by applying a gas pressure pulse to a gas injection orifice 406 (e.g., an inlet orifice, etc.) that is near one or more fluid ejection orifices. The orifices can be at the same elevation to prevent fluid leaking though the orifices by secondary gravity flows.

The flow loop sample generator 600 can include a centrifugal pump 610 (e.g., pump, etc.). The centrifugal pump can maintain a head of fluid in the upper reservoir 402. Fluid can drain from the upper reservoir 402 to the lower reservoir (e.g., molten salt process vessel, etc.) under gravity flow. The fluid sample 122 can be ejected on-demand from the fluid sample ejection orifice 120, by applying a gas pressure pulse from a heated gas line 612. The flow loop sample generator 600 can include a plug 614. The plug 614 can be removed to access the fluid sample ejection orifice 120 for installation or repair. In some embodiments, threaded or press-fit orifice fittings can be inserted into the gravity flow cell conduit 405. In other embodiments the orifice is machined directly into the gravity flow cell conduit 405.

The flow loop sample generator 600 can include a fluid source such as a process vessel or reservoir containing molten fluid. The flow loop sample generator 600 can include the upper reservoir 402 which is open to some ambient gas pressure or a first cover gas pressure. The upper reservoir 402 can contain a fluid head which provides a driving force for fluid gravity flow from a drain in the upper reservoir. The flow loop sample generator 600 can include one or more gravity flow cells 407, which can run from the upper reservoir 402 to the lower reservoir 408 or back to the fluid source. The gravity flow cell 407 can have an outlet gas pressure that is equal to or less than the ambient gas pressure or first cover gas pressure at the fluid surface of the upper reservoir 402. The flow loop sample generator 600 can include at least one orifice in a gravity flow cell wall for gas injection and at least one orifice in a gravity flow cell wall for fluid sample ejection. The ambient or cover gas pressure at the one or more ejection orifices can be greater than or equal to the ambient gas pressure at the fluid surface of the upper reservoir 402. The flow loop sample generator 600 can include one or more conduits 616. The conduit 616 can be a pump-driven conduit. The fluid source and the upper reservoir 402 can form a recirculating path from the fluid source through the pump-driven conduit to the upper reservoir 402, and from the upper reservoir through the gravity flow cell 407 to the fluid source. The one or more conduits 616 can be used for pump-driven fluid flow from the fluid source to the upper reservoir. The flow loop sample generator 600 can include one or more in-line pumps (e.g., a centrifugal pump 610, a diaphragm pump, bellows, etc.) to drive fluid flow from the fluid source to the upper reservoir. The flow loop sample generator 600 can include a pressurized gas supply manifold that feeds into one or more inlet orifices in the wall of a gravity flow cell. The pressurized gas supply can be controlled with a first valve (e.g., a normally closed pneumatic or solenoid valve that can be opened for variable amounts of time). The pressurized gas supply can have additional valves down-stream of the first valve to route gas pulses to different orifices or to venting. The flow loop sample generator 600 can include a control system to set the pump-driven fluid pumping rate and the gas pulse parameters (e.g., supply gas pressure, gas pulse length, gas routing, gas venting, etc.). In some embodiments, the flow loop sample generator 600 can be used for molten salt.

FIG. 7A illustrates a schematic diagram of a conduit 405 of a gravity flow cell. The conduit 405 has an inner diameter 708. The inner diameter 708 can be a characteristic diameter of the gravity flow cell. The fluid sample ejection orifice 120 is disposed on the conduit 405 of the gravity flow cell. The fluid sample ejection orifice 120 is oriented in a first direction (e.g., positive x-direction, etc.). The fluid sample ejection orifice 120 has a diameter 704. The diameter 704 can be between 0.010 inches and 0.040 inches. The diameter 704 can be greater than or equal to 0.040 inches. The diameter 704 can be less than or equal to 0.010 inches.

The gas injection orifice 406 is disposed on the conduit 405 of the gravity flow cell. The gas injection orifice 406 is oriented in a second direction (e.g., negative x-direction, etc.). The gas injection orifice 406 is located a distance 702 from the fluid sample ejection orifice 120. The distance 702 can be between 0.75 inches and 1.5 inches. The distance 702 can be greater than or equal to 1.5 inches. The distance 702 can be less than or equal to 0.75 inches. The distance 702 can be greater than or less than a multiple of the inner diameter 708 of the conduit 405 to avoid acoustic effects. The gas injection orifice 406 has a diameter 706. The diameter 706 can be between 0.5 mm and 6 mm. The diameter 706 can be greater than or equal to 6 mm. The diameter 706 can be less than or equal to 0.5 mm. The gas injection orifice 406 can be located downstream of the fluid sample ejection orifice 120 based on a flow direction 710. In some embodiments, the gas injection orifice 406 is located at the center of the conduit 405.

FIG. 7B illustrates a schematic cross-sectional view of a tube of the gravity flow cell shown in FIG. 7A, taken along plane A-A. The gas injection orifice 406 and the fluid sample ejection orifice 120 are separated by an angle α. In one embodiment, the angle α is 180 degrees. However, in various applications the angles may be substantially equal to (e.g., within 5% of, etc.) 10 degrees, 20 degrees, 30 degrees, 40 degrees, 50 degrees, 60 degrees, 70 degrees, 80 degrees, 90 degrees 100 degrees, 110 degrees, 120 degrees, 130 degrees, 140 degrees, 150 degrees, 160 degrees, 170 degrees, 180 degrees, or other similar values. The gas injection orifice 406 and the fluid sample ejection orifice 120 are oriented such that they are at approximately the same height with respect to gravitational force to prevent leaking to due secondary gravity flows.

FIG. 7C illustrates a schematic diagram of a tube of a gravity flow cell. The conduit 405 has an inner diameter 708. The fluid sample ejection orifice 120 is disposed on the conduit 405 of the gravity flow cell. The fluid sample ejection orifice 120 is oriented in a first direction. The fluid sample ejection orifice 120 has a diameter 704. The diameter 704 can be between 0.010 inches and 0.040 inches. The diameter 704 can be greater than or equal to 0.040 inches. The diameter 704 can be less than or equal to 0.010 inches.

The gas injection orifice 406 is disposed on the conduit 405 of the gravity flow cell. The fluid sample ejection orifice 120 is oriented in the first direction (e.g., negative y-direction, etc.). The gas injection orifice 406 is located a distance 702 from the fluid sample ejection orifice 120. The distance 702 can be between 0.75 inches and 1.5 inches. The distance 702 can be greater than or equal to 1.5 inches. The distance 702 can be less than or equal to 0.75 inches. The gas injection orifice 406 has a diameter 706. The diameter 706 can be between 0.5 mm and 6 mm. The diameter 706 can be greater than or equal to 6 mm. The diameter 706 can be less than or equal to 0.5 mm. The gas injection orifice 406 can be located downstream of the fluid sample ejection orifice 120 based on a flow direction 710. In some embodiments, the gas injection orifice 406 is located at the center of the conduit 405.

FIG. 7D illustrates a schematic cross-sectional view of a tube of the gravity flow cell shown in FIG. 7C, taken along plane B-B. The gas injection orifice 406 and the fluid sample ejection orifice 120 are separated by an angle α. In one embodiment, the angle α is 0 degrees. In the embodiment where the angle α is 0 degrees, the two orifices can face any direction with respect to the gravitational force.

Figure 8:
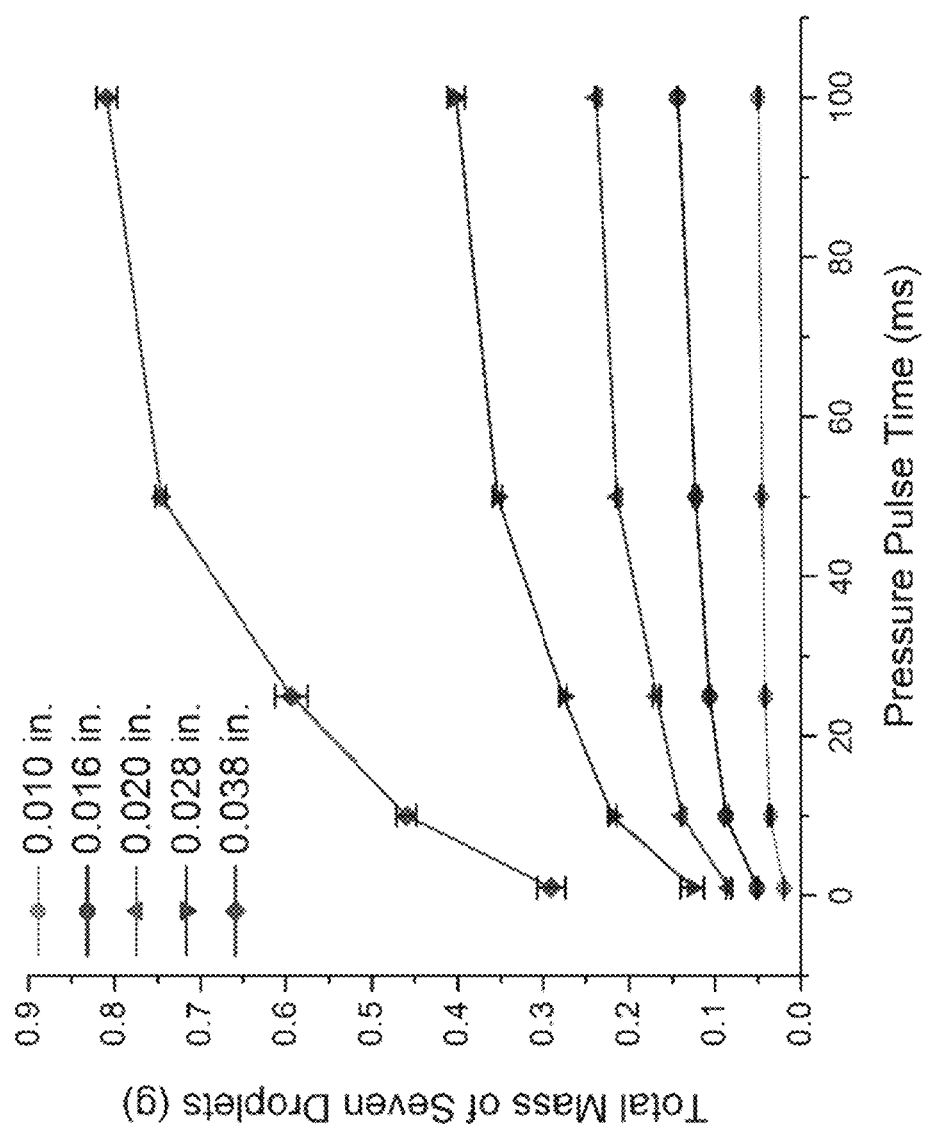
FIG. 8 illustrates the effect of pressure pulse length on sample size for various sample orifice diameters, according to an embodiment.

The effect of the pressure pulse length on sample size is shown in FIG. 8 for fluid sample ejection orifice 120 diameter 704 ranging from 0.010 to 0.038 inches, and a constant inert gas supply of 10.4 psig. The droplet size is presented as the combined weight of seven droplets. Each condition was measured three times, and the error bars depicted in FIG. 8 show repeatability of these experiments. Combining multiple droplets into a single sample can improve reproducibility in sample size by averaging out random error, so individual samples can have slightly larger errors than are reported in these plots. Conversely, increased precision can be achieved by combining larger numbers of droplets into a single sample.

Larger orifice diameters and longer pressure pulses can result in larger samples. At short pressure pulse times, single droplets can be formed. Increasing the pressure pulse time can result in the formation of a series of droplets that coalesce into a single uniform droplet. The longest pressure pulses can result in sample ejection as a stream, which can change to droplets if the gas pulse continues long enough to reach the fluid sample ejection orifice 120.

Figure 9:
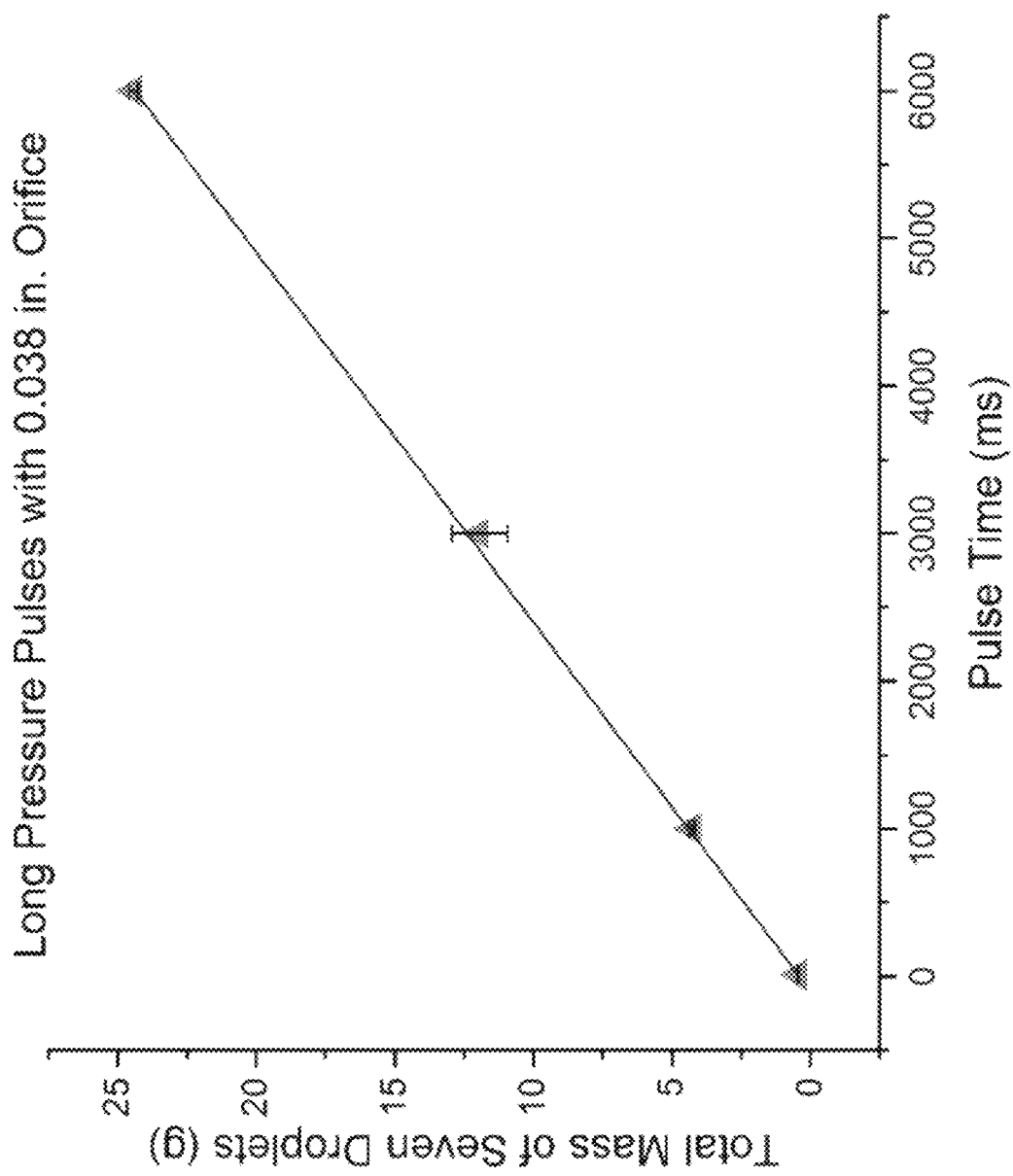
FIG. 9 illustrates the effect of pressure pulse length on droplet size, according to an embodiment.

FIG. 9 shows the linear relationship between pulse length and sample size for extended pressure pulse times. Fluid was ejected at approximately 500 μL per second for the case where the fluid sample ejection orifice 120 diameter 704 is equal to 0.038". These results indicate that the upper limit of sample sizes that can be produced with this technique is limited only by the accessible volume of the fluid source.

Figure 10:
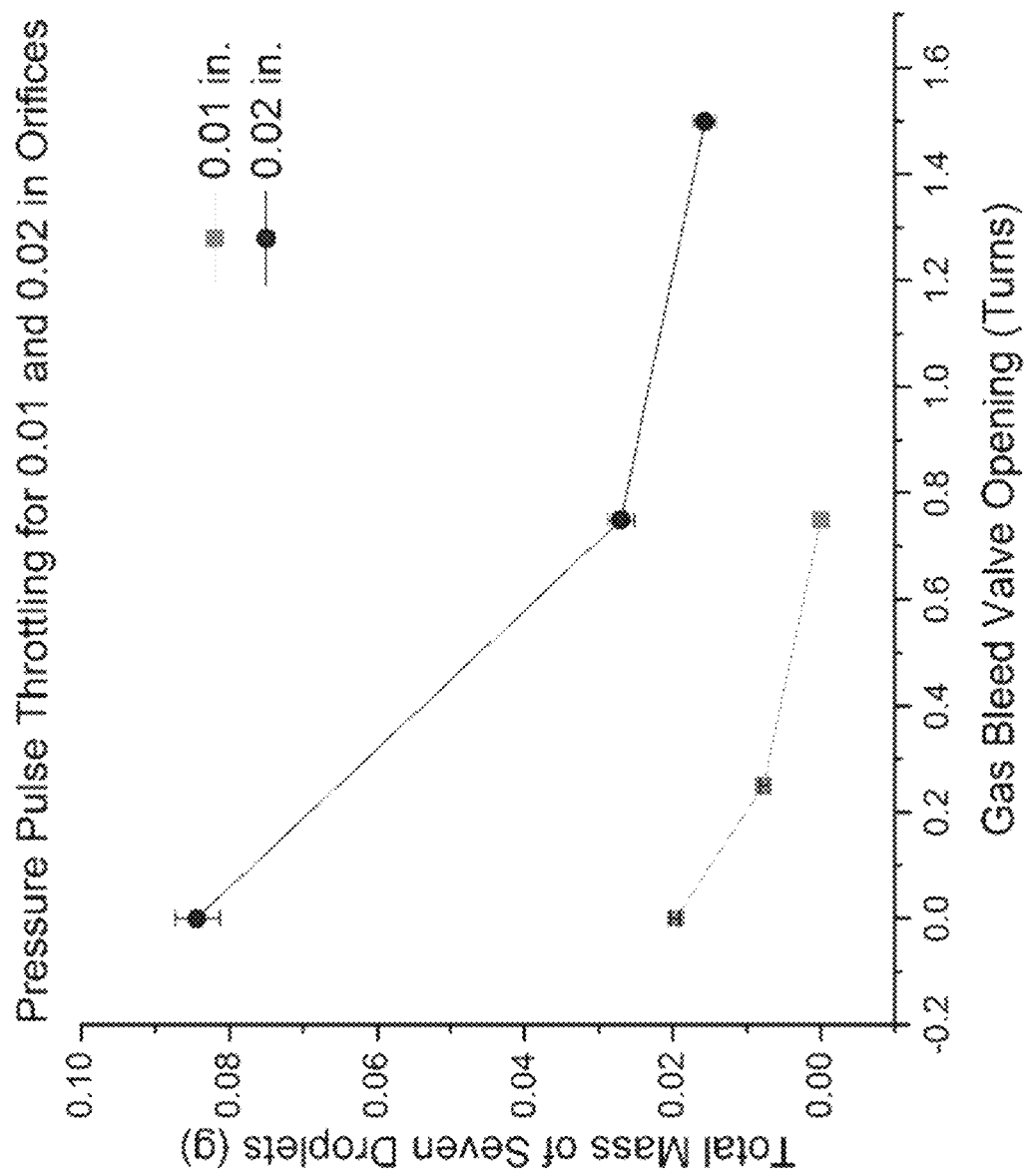
FIG. 10 illustrates the effect of pressure pulse throttling on droplet size, according to an embodiment.

For high precision pressure pulses, a normally closed rapid response solenoid valve (Festo MHJ10) with a pneumatic spring was employed for the tests reported in FIGS. 8, 9, and 10. Very small sample sizes can be produced in the system by throttling the pressure pulse using a bleed line. The inert gas line downstream of the solenoid valve can be split into two lines. One line can supply the pressure pulse to the droplet generator while the other line can be capped with a valve (e.g., Parker needle valve 2M-V4LR-B-T).

FIG. 10 shows the effect of throttling the pressure pulse by opening the needle valve for the cases where the fluid sample ejection orifice 120 diameter 704 is equal to 0.010" and 0.020". The plot shows a decrease in droplet size when the pressure pulse is split between the droplet generator and the partially open needle valve. Samples as small as 100 nL can be produced reliably by this method.

Figure 11:
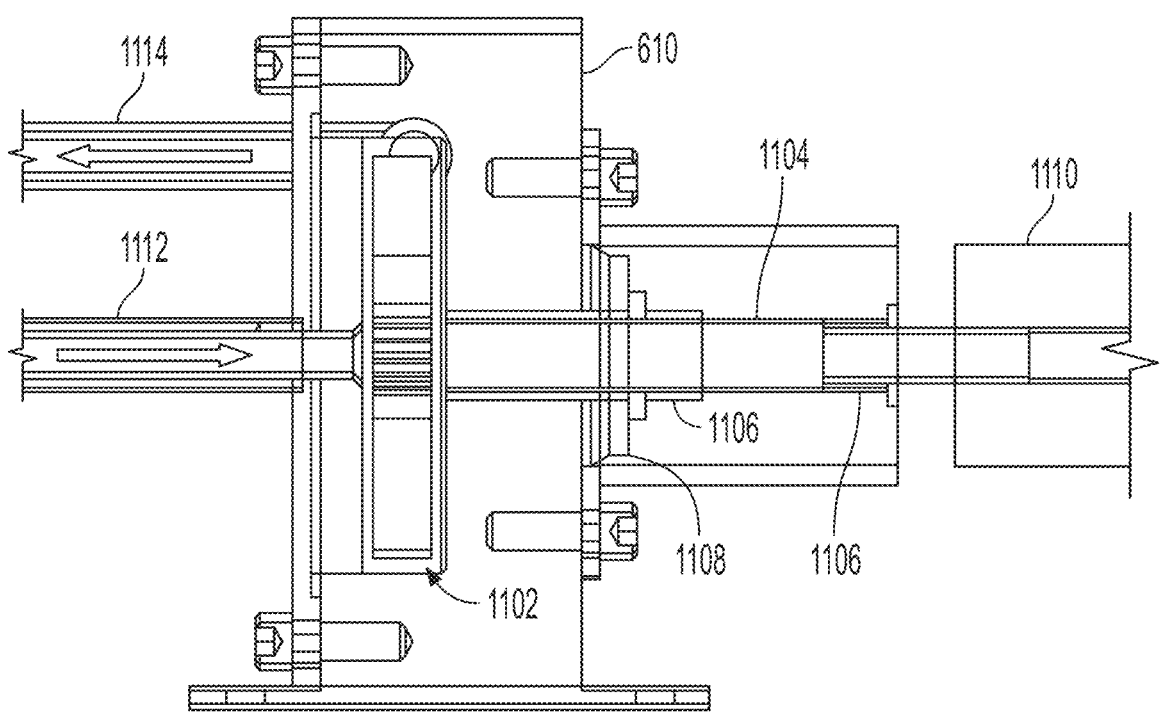
FIG. 11 illustrates a cross-sectional view of a centrifugal pump, according to an embodiment.

FIG. 11 illustrates a cross-sectional view of a molten salt-compatible centrifugal pump 610 according to an embodiment. The centrifugal pump 610 can include an impeller 1102. The impeller 1102 can include an impeller shaft 1104. The impeller 1102 can increase the pressure and flow of fluid from a flow-in conduit 1112 and redirect the fluid to a flow-out conduit 1114.

The centrifugal pump 610 can include thrush bushings 1106. For example, the thrush bushings can include Graphalloy® steel-graphite alloy thrush bushings. The thrush bushings 1106 can be coupled to the impeller shaft 1104. The thrush bushings 1106 can support the impeller shaft 1104. The impeller of impeller shaft 1104 can be a single-stage impeller or a two-stage impeller. The impeller can have a plurality of vanes. The plurality of vanes can include constant breadth vanes or tapered vanes. The plurality of vanes can have a non-zero curvature or zero curvature. The centrifugal pump 610 can include a sealing ring 1108 (e.g. Grafoil® sealing ring, Grafoil® mechanical rotary seal, etc.). The centrifugal pump 610 can include a ceramic coupling collar 1110.

Figure 12:
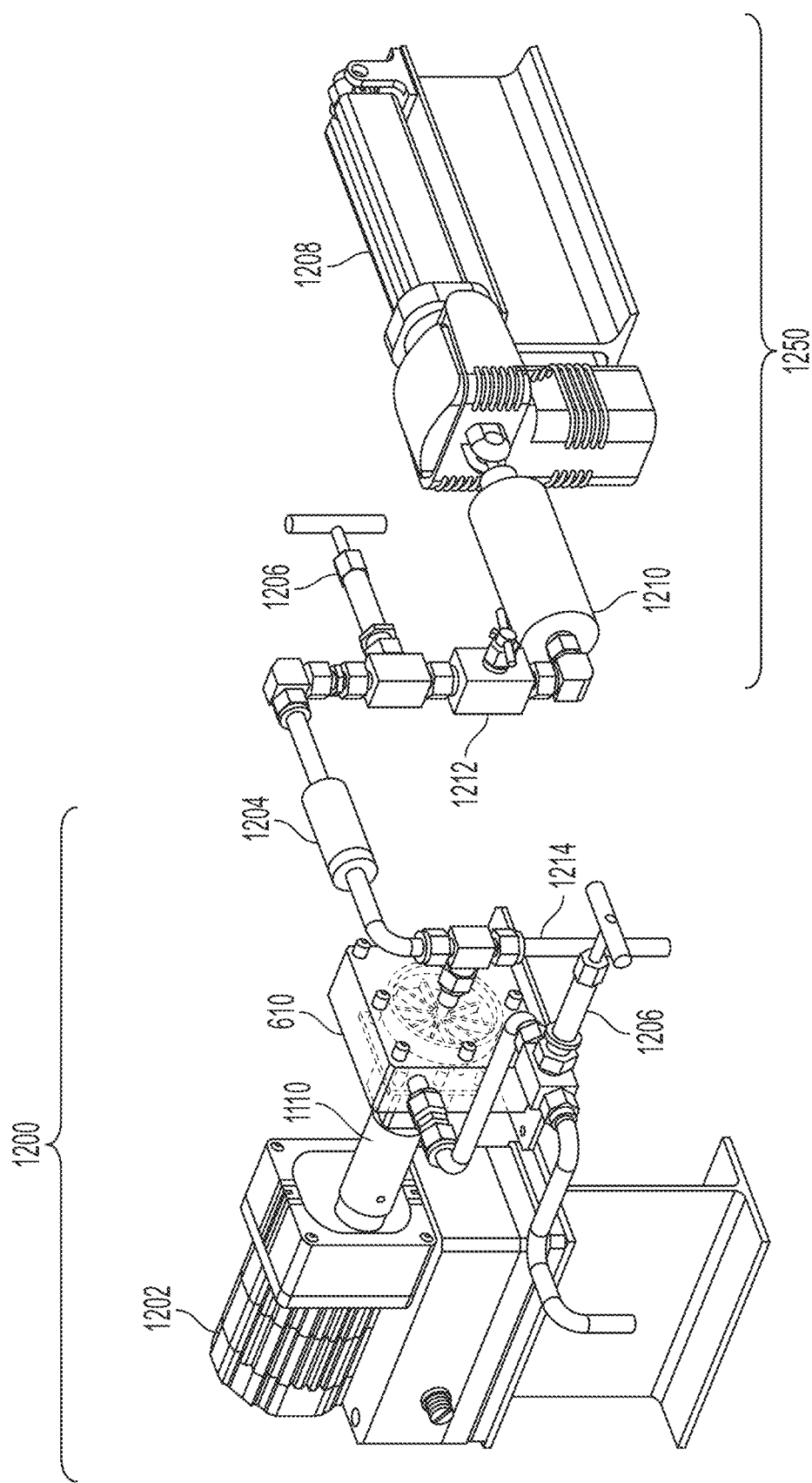
FIG. 12 illustrates a molten salt pump with priming module, according to an embodiment.

FIG. 12 illustrates a molten salt pump assembly 1200 with a bellows-based pump priming module 1250 according to an embodiment. The pump assembly 1200 can include a motor 1202. The motor 1202 can supply motive power for the centrifugal pump 610. The motor 1202 can be coupled to the ceramic coupling collar 1110 (e.g., ceramic coupling, etc.) through a flexible shaft coupling. The molten salt pump priming module 1250 can include a vapor trap 1204 between the salt supply and the bellows. The pump assembly 1200 can include a bellow sealed valve 1206. The bellow sealed valve 1206 can include a control valve to balance pressure. The priming module 1250 can prime the centrifugal pump 610. The priming module 1250 can include a bellow sealed valve 1206. The priming module 1250 can include bellows 1210 for evacuating gas from the conduit 1214 between the salt supply and the pump. The priming module 1250 can include a linear actuator 1208. The linear actuator 1208 can create motion to power the bellows 1210. The priming module 1250 can include a bleed valve 1212 to dispense the gas that was evacuated from conduit 1214 into the bellows

1210. The vapor trap 1204 can be disposed between the centrifugal pump 610 and the bleed valve 1212.

Figure 13:
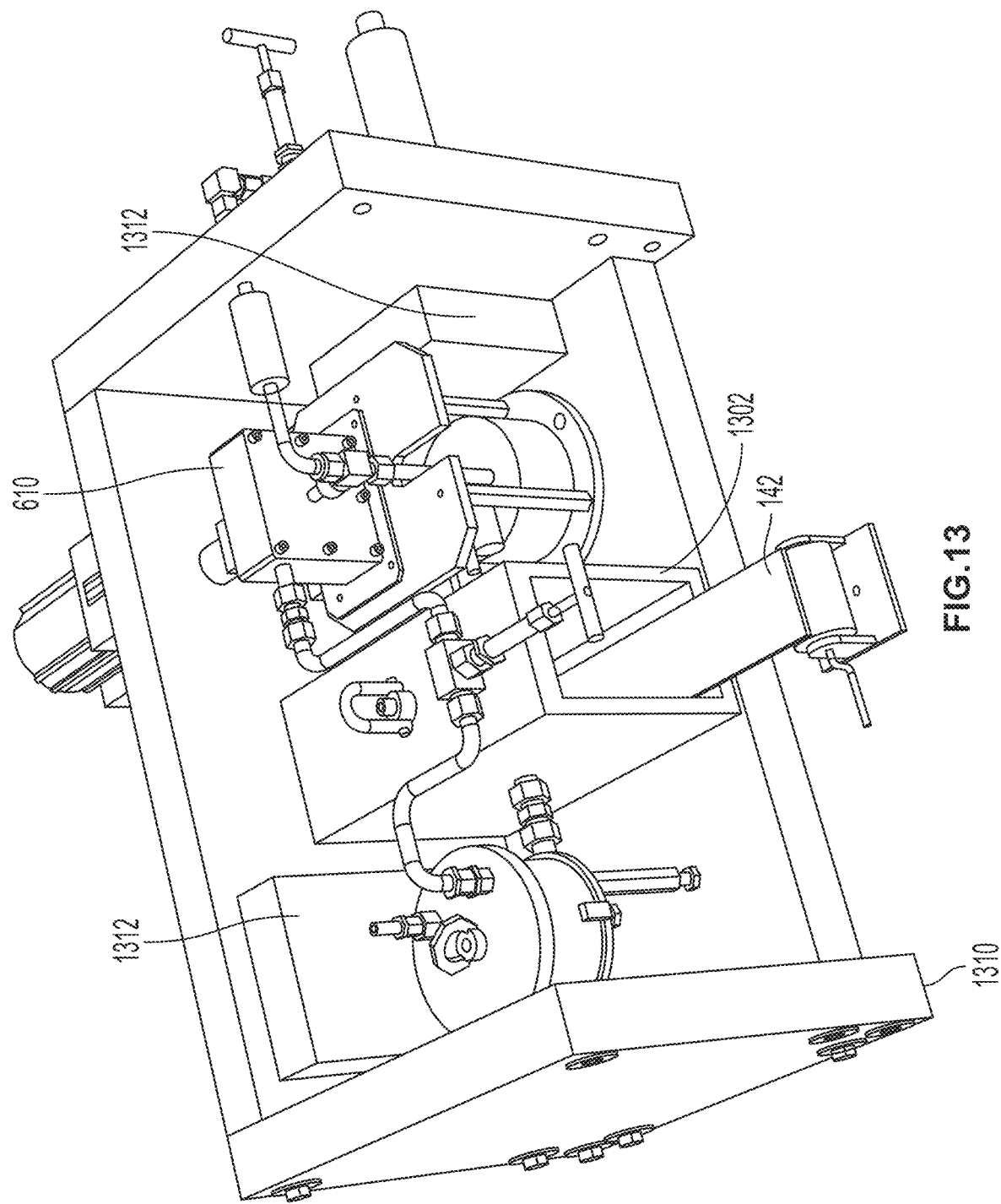
FIG. 13 illustrates a perspective view of a two-chamber oven, according to an embodiment.

FIG. 13 illustrates a perspective view of a two-chamber oven according to an embodiment. The two-chamber oven can include a first chamber and a second chamber. The first chamber can include an inner chamber 1302. The inner chamber 1302 can contain a portion of the analysis substrate 142. The inner chamber 1302 can house the analysis substrate 142. The inner chamber 1302 can contain the fluid sample 122. The inner chamber 1302 can be heated independently of the outer chamber and can have a separate access panel. The second chamber can include an outer chamber 1310. The outer chamber 1310 can house the inner chamber 1302. The outer chamber 1310 can include one or more heaters 1312. The outer chamber 1310 can include the centrifugal pump 610.

Figure 14:
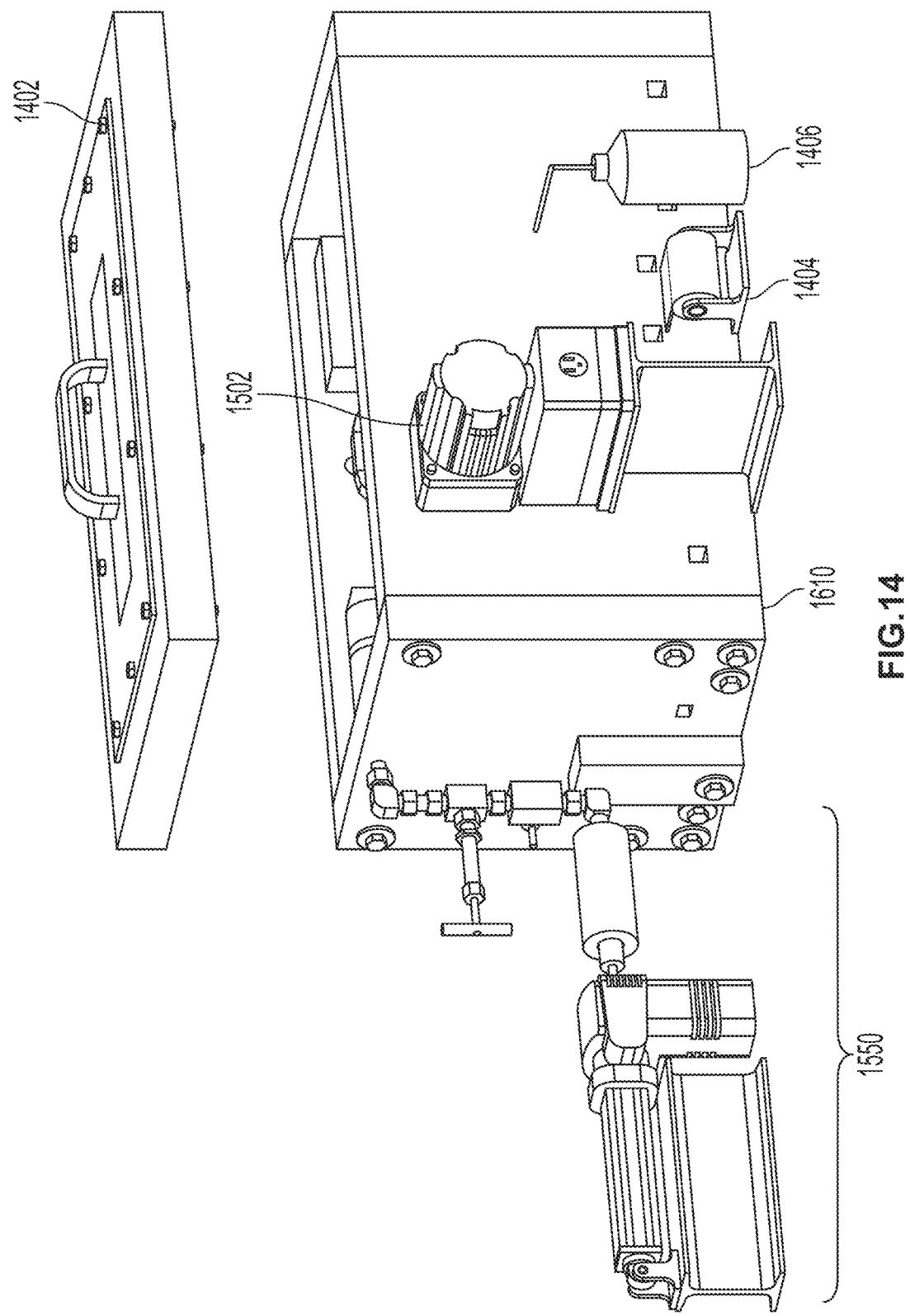
FIG. 14 illustrates a perspective view of a two-chamber oven, according to an embodiment.

FIG. 14 illustrates a perspective view of a two-chamber oven. The two-chamber oven can include a first chamber and a second chamber. The second chamber can include the outer chamber 1310. The two-chamber oven assembly can include the priming module 1250. The priming module can be disposed exterior to the outer chamber 1310. The two-chamber oven assembly can include the motor 1202. The motor 1202 can be disposed exterior to the outer chamber 1310. The two-chamber oven can include a substrate roll feed 1404. The substrate roll feed 1404 can supply the analysis substrate 142 to the sampling system 110. The substrate roll feed 1404 can move the analysis substrate 142 into the sampling system 110. The two-chamber oven can include a gas supply 1406. The gas supply 1406 can include a pressurized gas supply. The gas supply 1406 can apply pneumatic actuation to the gas injection orifice 406.

Figure 15:
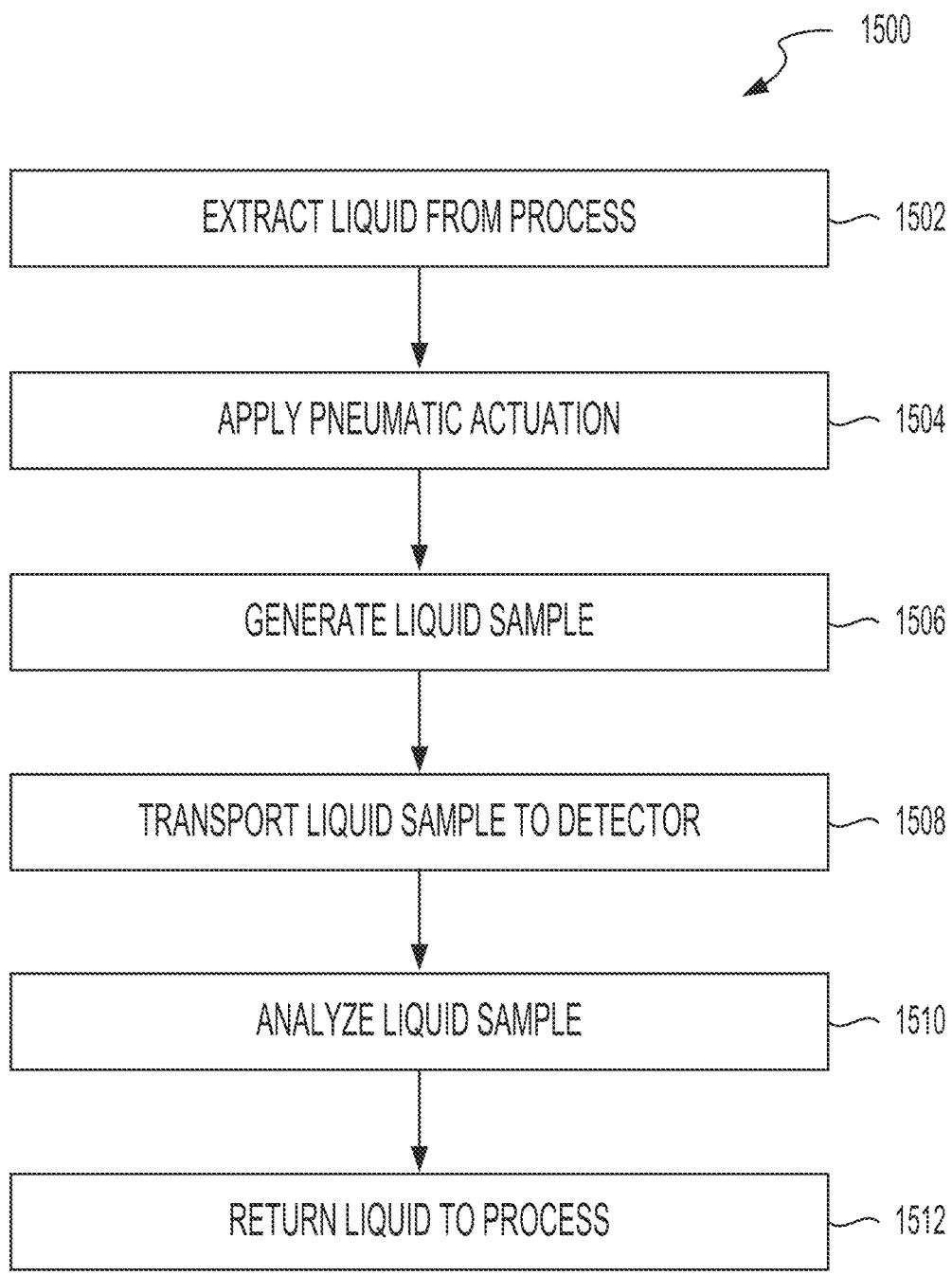
FIG. 15 illustrates a method for analyzing a process fluid, according to an embodiment.

FIG. 15 illustrates a method for analyzing a process fluid. In brief summary, the method 1500 can include extracting a fluid from a process (BLOCK 1502). The method 1500 can include applying pneumatic actuation to a gas injection orifice (BLOCK 1504). The method 1500 can include generating, through a fluid sample ejection orifice, a fluid sample from the fluid extracted from the process (BLOCK 1506). The method 1500 can include transporting the droplet to a detector (BLOCK 1508). The method 1500 can include analyzing, by the detector, a property of the droplet (BLOCK 1510). The method 1500 can include returning the fluid extracted from the process to the process (BLOCK 1512).

The method 1500 can include extracting a fluid from a process (BLOCK 1502). The process can include a fluid source. The process can include a process vessel. The process can include a process stream. Molten salts (e.g., LiCl—KCl eutectic, etc.), molten salt electrolyte solutions, molten metals (aluminum, etc.), organic or aqueous solvents, solutes, entrained gases or solids, radioactive materials, or combinations thereof can comprise the liquid source.

The method 1500 can include applying pneumatic actuation to a gas injection orifice (BLOCK 1504). Applying pneumatic actuation to the gas injection orifice can include applying a gas pressure pulse to the gas injection orifice. The gas injection orifice and the fluid sample ejection orifice can be oriented in a first direction. The gas injection orifice can be oriented in a first direction and the fluid sample ejection orifice can be oriented in a second direction.

The method 1500 can include generating, through a fluid sample ejection orifice, a fluid sample from the fluid extracted from the process (BLOCK 1506). The fluid sample can include a droplet, a stream of droplets, or a stream of fluid, or a combination of a stream and droplets. The fluid sample can include a substance or a sample that is not a fluid phase after the fluid sample leaves the ejection orifice. For example, the fluid sample can solidify into a solid sample at room temperature. The fluid sample can solidify into a pellet after the fluid sample leaves the ejection orifice. The sample can include a droplet having a volume of at least 100 nL. The sample can include a stream ejected from the fluid sample ejection orifice at a rate of at least 50 µL per second. The sample can include a stream of droplets ejected from the fluid sample ejection orifice at a rate of 30 mL per minute. The sample can include a rounded droplet or a flat droplet depending on the wetting properties of the substrate. The sample can be a fluid phase or solid phase. The sample can undergo rapid cooling which can allow for analysis of solid samples by standard room temperature analytical equipment or collection in a pourable pellet form.

The method 1500 can include transporting the droplet to a detector (BLOCK 1508). The detector can include an alpha particle spectrometer, a gamma ray spectrometer, a neutron spectrometer, a laser induced breakdown spectrometer, an ultraviolet-visible spectrometer, a Raman spectrometer, an X-ray fluorescence spectrometer, a Fourier transform infrared spectrometer, an X-ray diffraction spectrometer, an X-ray photoelectron spectrometer, an electrochemical sensor, a piezoelectric sensor, mass spectrometer, a density sensor, a viscosity sensor, an acoustic sensor, an imager and image analysis system, a calorimeter, or a temperature sensor. Transporting the droplet to a detector can include moving an analysis substrate using a substrate roll feed or using a rotating platform.

The method 1500 can include analyzing, by the detector, a property of the droplet (BLOCK 1510). The property of the droplet can include a thermophysical or thermochemical property (e.g., viscosity, density, thermal conductivity, heat capacity, freezing behavior, solubility of reaction and corrosion products, index of refraction, etc.). The detector can perform chemical, isotopic, or particle measurements. The detector can measure or analyze properties of the droplet or fluid sample. The detector can measure or analyze properties of the molten salt or molten metal.

The method 1500 can include returning the fluid extracted from the process to the process (BLOCK 1512). Returning the fluid extracted from the process to the process can include using gravity flow, vacuum transport, or pressure driven flow using a pump (e.g., centrifugal pump, etc.) to carry the fluid back to the process. Returning the fluid extracted from the process to the process can complete the recirculating flow path from the fluid source through the pump-driven conduit to the upper reservoir, and from the upper reservoir through the gravity flow cell to the fluid source Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A sample generator system, comprising:
an upper reservoir with a first cross-sectional area configured to controllably contain a fluid, the upper reservoir vented to at least one of an ambient gas pressure, atmospheric pressure, or a cover gas pressure;
a gravity flow cell with a second cross-sectional area that is less than the first cross-sectional area, the gravity flow cell configured to receive the fluid from the upper reservoir and configured to eject a fluid sample from a flowing fluid through a fluid sample ejection orifice in the gravity flow cell, wherein a gravity flow cell outlet and the fluid sample ejection orifice are vented to the same gas pressure as the upper reservoir;
a sampling system in communication with the gravity flow cell and configured to receive the fluid sample;
a gas pressure at the fluid sample ejection orifice in the gravity flow cell greater than or equal to a fluid pressure at the fluid sample ejection orifice in the gravity flow cell; and
a gas injection orifice disposed on the gravity flow cell.

2. The system of claim 1, further comprising:
a nozzle positioned a distance from the gravity flow cell, the nozzle configured to supply a gas pulse.

3. The system of claim 1, further comprising:
a pump-driven conduit; and
a lower reservoir and the upper reservoir forming a recirculating flow path from the lower reservoir through the pump-driven conduit to the upper reservoir, and from the upper reservoir through the gravity flow cell to the lower reservoir.

4. The system of claim 1, further comprising:
the gas injection orifice disposed on the gravity flow cell downstream of the fluid sample ejection orifice.

5. The system of claim 1, further comprising:
a characteristic diameter of the gravity flow cell; and
the gas injection orifice disposed on the gravity flow cell a distance from the fluid sample ejection orifice, the distance greater than or less than a multiple of the characteristic diameter of the gravity flow cell.

6. The system of claim 1, wherein the fluid sample ejection orifice is oriented in a first direction, the system further comprising:
the gas injection orifice oriented in the first direction.

7. The system of claim 1, wherein the fluid sample ejection orifice is oriented in a first direction, the system further comprising:
the gas injection orifice oriented in a second direction.

8. The system of claim 1, wherein the sample generator system generates a sample having a volume of at least 100 nL.

9. The system of claim 1, wherein the fluid sample is a substance, the system comprising:
a substrate;
the substance configured to be disposed on the substrate; and
at least one of an alpha particle spectrometer, a gamma ray spectrometer, a neutron spectrometer, a laser induced breakdown spectrometer, an ultraviolet-visible spectrometer, a Raman spectrometer, an X-ray fluorescence spectrometer, a Fourier transform infrared spectrometer, an X-ray diffraction spectrometer, an X-ray photoelectron spectrometer, an electrochemical sensor, a piezoelectric sensor, a mass spectrometer, a density sensor, a viscosity sensor, an acoustic sensor, an imager and image analysis system, a calorimeter, or a temperature sensor to measure a property of the substance.

10. The system of claim 1,
wherein the fluid sample is a stream ejected from the fluid sample ejection orifice at a rate of at least 50 µL per second.

11. The system of claim 1, wherein the fluid is at least one of a molten salt or molten metal.

12. A method for analyzing a process fluid, comprising:
extracting a fluid from a process;
applying pneumatic actuation to a gas injection orifice; and
generating, through a fluid sample ejection orifice, a sample from the fluid extracted from the process;
wherein the sample extracted from the process is returned to the process.

13. The method of claim 12, wherein the sample is a spotted sample droplet, the method further comprising:
transporting the spotted sample droplet to a detector; and
analyzing, by the detector, a property of the spotted sample droplet.

14. The method of claim 12, the method further comprising:
transporting the sample to a detector; and
analyzing, by the detector, a property of the sample;
wherein the detector is at least one of an alpha particle spectrometer, a gamma ray spectrometer, a neutron spectrometer, a laser induced breakdown spectrometer, an ultraviolet-visible spectrometer, a Raman spectrometer, an X-ray fluorescence spectrometer, a Fourier transform infrared spectrometer, an X-ray diffraction spectrometer, an X-ray photoelectron spectrometer, an electrochemical sensor, a piezoelectric sensor, a mass spectrometer, a density sensor, a viscosity sensor, an acoustic sensor, an imager and image analysis system, a calorimeter, or a temperature sensor.

15. The method of claim 12, wherein the sample is a stream ejected from the fluid sample ejection orifice at a rate of at least 50 µL per second.

16. The method of claim 12, wherein the gas injection orifice and the fluid sample ejection orifice are oriented in a first direction.

17. A sample generator system, comprising:
an upper reservoir with a first cross-sectional area configured to controllably contain a fluid, the upper reservoir vented to at least one of an ambient gas pressure, atmospheric pressure, or a cover gas pressure;
a gravity flow cell with a second cross-sectional area that is less than the first cross-sectional area, the gravity flow cell configured to receive the fluid from the upper reservoir and configured to eject a fluid sample from a flowing fluid through a fluid sample ejection orifice in the gravity flow cell, wherein a gravity flow cell outlet and the fluid sample ejection orifice are vented to the same gas pressure as the upper reservoir;
a sampling system in communication with the gravity flow cell and configured to receive the fluid sample;
a gas pressure at the fluid sample ejection orifice in the gravity flow cell greater than or equal to a fluid pressure at the fluid sample ejection orifice in the gravity flow cell;
a pump-driven conduit; and
a lower reservoir and the upper reservoir forming a recirculating flow path from the lower reservoir through the pump-driven conduit to the upper reservoir, and from the upper reservoir through the gravity flow cell to the lower reservoir.

18. The system of claim 17, further comprising:
a gas injection orifice disposed on the gravity flow cell downstream of the fluid sample ejection orifice.

19. The system of claim 17, wherein the fluid sample is a substance, the system comprising:
a substrate;
the substance configured to be disposed on the substrate; and at least one of an alpha particle spectrometer, a gamma ray spectrometer, a neutron spectrometer, a laser induced breakdown spectrometer, an ultraviolet-visible spectrometer, a Raman spectrometer, an X-ray fluorescence spectrometer, a Fourier transform infrared spectrometer, an X-ray diffraction spectrometer, an X-ray photoelectron spectrometer, an electrochemical sensor, a piezoelectric sensor, a mass spectrometer, a density sensor, a viscosity sensor, an acoustic sensor, an imager and image analysis system, a calorimeter, or a temperature sensor to measure a property of the substance.

20. The system of claim 17, wherein the fluid is at least one of a molten salt or molten metal.

* * * * *